United States Patent
Huang et al.

(10) Patent No.: US 10,111,237 B2
(45) Date of Patent: Oct. 23, 2018

(54) COMMUNICATION METHOD, APPARATUS, AND SYSTEM

(71) Applicant: Huawei Technologies Co., Ltd., Shenzhen (CN)

(72) Inventors: Lei Huang, Shanghai (CN); Yi Wang, Shanghai (CN); Yongming Liang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 91 days.

(21) Appl. No.: 15/196,188

(22) Filed: Jun. 29, 2016

(65) Prior Publication Data
US 2016/0309490 A1    Oct. 20, 2016

Related U.S. Application Data

(63) Continuation of application No. PCT/CN2013/091060, filed on Dec. 31, 2013.

(51) Int. Cl.
*H04W 72/08* (2009.01)
*H04W 48/08* (2009.01)
(Continued)

(52) U.S. Cl.
CPC ......... *H04W 72/085* (2013.01); *H04W 24/08* (2013.01); *H04W 48/08* (2013.01);
(Continued)

(58) Field of Classification Search
CPC ............... H04W 72/085; H04W 24/08; H04W 72/0453; H04W 48/08; H04W 84/045; Y02B 60/50
See application file for complete search history.

(56) References Cited

U.S. PATENT DOCUMENTS

2010/0056160 A1    3/2010    Kim et al.
2011/0182174 A1    7/2011    Pi et al.
(Continued)

FOREIGN PATENT DOCUMENTS

CN    103348757 A    10/2013
EP    2584843 A1    4/2013
(Continued)

OTHER PUBLICATIONS

"Requirements, Candidate Solutions & Technology Roadmap for LTE Rel-12 Onward," 3GPP Workshop on Release 12 and Onwards, NTT Docomo, Inc., Ljubljana, Slovenia, Jun. 11-12, 2012, 27 pages.
(Continued)

*Primary Examiner* — Andrew Lai
*Assistant Examiner* — Harry H Kim
(74) *Attorney, Agent, or Firm* — Slater Matsil, LLP

(57) ABSTRACT

A communication method, apparatus, and system is described. The communication method includes sending, by a cellular base station, measurement indication information to a millimeter wave base station and a user equipment, acquiring, by the cellular base station, the measurement result, determining a to-be-accessed millimeter wave base station of the user equipment according to the measurement result, and sending, by the cellular base station, millimeter wave frequency band parameter configuration information of the to-be-accessed millimeter wave base station to the user equipment.

16 Claims, 10 Drawing Sheets

(51) Int. Cl.
  *H04W 28/08* (2009.01)
  *H04W 72/04* (2009.01)
  *H04W 84/04* (2009.01)
  *H04W 24/08* (2009.01)

(52) U.S. Cl.
  CPC ...... *H04W 72/0453* (2013.01); *H04W 84/045* (2013.01); *Y02D 70/00* (2018.01); *Y02D 70/1262* (2018.01); *Y02D 70/164* (2018.01)

(56) References Cited

U.S. PATENT DOCUMENTS

| | | |
|---|---|---|
| 2012/0155443 A1 | 6/2012 | Cordeiro |
| 2012/0314614 A1 | 12/2012 | Wentink et al. |
| 2013/0095836 A1 | 4/2013 | Carmon et al. |
| 2015/0004918 A1* | 1/2015 | Wang .................... H04W 88/02 455/73 |
| 2015/0245270 A1* | 8/2015 | Wu ...................... H04W 40/005 370/331 |
| 2016/0242061 A1* | 8/2016 | Harada ................. H04L 5/0098 |

FOREIGN PATENT DOCUMENTS

| | | |
|---|---|---|
| JP | 2012500606 A | 1/2012 |
| JP | 2012195828 A | 10/2012 |
| KR | 20100026921 A | 3/2010 |
| KR | 20130042455 A | 4/2013 |
| WO | 2013086164 A1 | 6/2013 |
| WO | 2013086410 A2 | 6/2013 |

OTHER PUBLICATIONS

Pi, Z. et al., "System Design and Network Architecture for a Millimeter-wave Mobile Broadband (MMB) System," 2011 34th IEEE Sarnoff Symposium, May 3-4, 2011, 6 pages.

"Scenario and Candidate Technologies for Small Cell Enhancement," Source: NTT DOCOMO, Agenda Item: 7.3.5.1, Document for: Discussion and Decision, 3GPP TSG RAN WG1 Meeting #72, R1-130402, Jan. 28-Feb. 1, 2013, 9 pages.

"Overview of Mobility Enhancement for Small Cell Enhancement," Source: NTT DOCOMO, Agenda Item: 7.3.5.3, Document for: Discussion and Decision, 3GPP TSG RAN WG1 Meeting #72, R1-130405, Jan. 28-Feb. 1, 2013, 8 pages.

* cited by examiner

A cellular base station sends measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station  ⟵ 101

The cellular base station acquires the measurement result, and determines a to-be-accessed millimeter wave base station of the user equipment according to the measurement result  ⟵ 102

The cellular base station sends millimeter wave frequency band parameter configuration information of the to-be-accessed millimeter wave base station to the user equipment, so that the user equipment accesses the to-be-accessed millimeter wave base station according to the millimeter wave frequency band parameter configuration information  ⟵ 103

FIG. 3

The cellular base station determines whether the to-be-accessed millimeter wave base station is in a working state  ⟵ 201

If not, the cellular base station sends a wake-up instruction to the to-be-accessed millimeter wave base station, and after the to-be-accessed millimeter wave base station is waken up, sends the millimeter wave frequency band parameter configuration information to the to-be-accessed millimeter wave base station; or the cellular base station sends a wake-up instruction to the to-be-accessed millimeter wave base station, and after the to-be-accessed millimeter wave base station is waken up, receives the millimeter wave frequency band parameter configuration information sent by the millimeter wave base station  ⟵ 202

FIG. 4

COMMUNICATION METHOD, APPARATUS, AND SYSTEM

CROSS-REFERENCE TO RELATED APPLICATIONS

This application is a continuation of International Application No. PCT/CN2013/091060, filed on Dec. 31, 2013, which is hereby incorporated by reference in its entirety.

TECHNICAL FIELD

Embodiments of the present invention relate to communications technologies, and in particular, to a communication method, apparatus, and system.

BACKGROUND

With increasingly requirements for mobile data services, most low-frequency band spectrum resources applicable to mobile communication have been allocated (for example, a frequency band lower than 3 GHz), but in a frequency band of 3 to 300 GHz, a large quantity of spectrum resources have not been allocated for use. According to a definition of the International Telecommunication Union (ITU), a frequency band of 3 to 30 GHz is referred to as a super high frequency (SHF) frequency band, and a frequency band of 30 to 300 GHz is referred to as an extremely high frequency (EHF) frequency band. Because the SHF and EHF frequency bands have a similar transmission feature, for example, a transmission loss is relatively large, and a wavelength ranges between 1 millimeter and 100 millimeters, the frequency band of 3 to 300 GHz is also collectively referred to as a millimeter wave frequency band. At present, research of applying the millimeter wave frequency band to cellular mobile communication is still at an initial stage, a technology is not mature, and many difficulties still remain to be overcome.

In an existing implementation solution, a high-speed data service is provided by using a millimeter wave frequency band, a millimeter wave base station is deployed within coverage of a cellular base station, and a user equipment needs to measure a cellular frequency band to access the cellular base station; in addition, the user equipment further needs to measure the millimeter wave frequency band except the conventional cellular frequency band to access the millimeter wave base station. Even though the user equipment is not within coverage of any millimeter wave base station, the user equipment still needs to continually perform inter-frequency cell search and measurement, which inevitably quickens consumption of battery power of the user equipment, and causes unnecessary waste. Similarly, when the millimeter wave base station serves no user, the millimeter wave base station still needs to continually transmit a measurement signal and a pilot signal, which also wastes power on the millimeter wave base station side, further causes pilot pollution, and causes interference to another millimeter wave base station around, thereby decreasing a system throughput.

SUMMARY

Embodiments of the present disclosure provide a communication method, apparatus, and system, so as to reduce unnecessary inter-frequency cell search and measurement of a user equipment, decrease consumption of battery power of the user equipment, reduce unnecessary measurement signal and pilot signal transmission of a millimeter wave base station, and avoid power consumption, pilot pollution, and a throughput decrease of the millimeter wave base station.

According to a first aspect, an embodiment provides a communication method, including sending, by a cellular base station, measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station; acquiring, by the cellular base station, the measurement result, and determining a to-be-accessed millimeter wave base station of the user equipment according to the measurement result; and sending, by the cellular base station, millimeter wave frequency band parameter configuration information of the to-be-accessed millimeter wave base station to the user equipment, so that the user equipment accesses the to-be-accessed millimeter wave base station according to the millimeter wave frequency band parameter configuration information.

According to a second aspect, an embodiment provides a communication method, including receiving, by a millimeter wave base station, measurement indication information sent by a cellular base station, and performing, by the millimeter wave base station, signal measurement interaction with a user equipment in a cellular frequency band according to the measurement indication information, so that the cellular base station acquires a measurement result, and determines, according to the measurement result, whether the millimeter wave base station is a to-be-accessed millimeter wave base station of the user equipment.

According to a third aspect, an embodiment provides a communication method, including receiving, by a user equipment in a cellular frequency band, measurement indication information sent by a cellular base station, performing, by the user equipment, signal measurement interaction with a millimeter wave base station in the cellular frequency band according to the measurement indication information, so that the cellular base station acquires a measurement result, and determines, according to the measurement result, whether the millimeter wave base station is a to-be-accessed millimeter wave base station of the user equipment, and receiving, by the user equipment in the cellular frequency band, millimeter wave frequency band parameter configuration information of the to-be-accessed millimeter wave base station that is sent by the cellular base station, and according to the millimeter wave frequency band parameter configuration information, waking up a millimeter wave frequency band function and accessing the to-be-accessed millimeter wave base station.

According to a fourth aspect, an embodiment provides a cellular base station, including an indication information sending module, configured to send measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station, an acquiring module, configure to acquire the measurement result, and determine a to-be-accessed millimeter wave base station of the user equipment according to the measurement result, and a configuration information sending module, configured to send millimeter wave frequency band parameter configuration information of the to-be-accessed millimeter wave base station to the user equipment, so that the user equipment accesses the to-be-accessed millimeter wave base station according to the millimeter wave frequency band parameter configuration information.

According to a fifth aspect, an embodiment provides a millimeter wave base station, including an indication information receiving module, configured to receive measurement indication information sent by a cellular base station, and an interacting module, configured to perform signal measurement interaction with a user equipment in a cellular frequency band according to the measurement indication information, so that the cellular base station acquires a measurement result, and determines, according to the measurement result, whether the millimeter wave base station is a to-be-accessed millimeter wave base station of the user equipment.

According to a sixth aspect, an embodiment provides a user equipment, including an indication information receiving module, configured to receive, in a cellular frequency band, measurement indication information sent by a cellular base station, an interacting module, configured to perform signal measurement interaction with a millimeter wave base station in the cellular frequency band according to the measurement indication information, so that the cellular base station acquires a measurement result, and determines, according to the measurement result, whether the millimeter wave base station is a to-be-accessed millimeter wave base station of the user equipment, and a configuration information receiving module, configured to receive, in the cellular frequency band, millimeter wave frequency band parameter configuration information of the to-be-accessed millimeter wave base station that is sent by the cellular base station, and according to the millimeter wave frequency band parameter configuration information, wake up a millimeter wave frequency band function and access the to-be-accessed millimeter wave base station.

According to a seventh aspect, an embodiment provides a cellular base station, including a transmitter, configured to send measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station, and a processor, configure to acquire the measurement result, and determine a to-be-accessed millimeter wave base station of the user equipment according to the measurement result; where the transmitter is further configured to send millimeter wave frequency band parameter configuration information of the to-be-accessed millimeter wave base station to the user equipment, so that the user equipment accesses the to-be-accessed millimeter wave base station according to the millimeter wave frequency band parameter configuration information.

According to an eighth aspect, an embodiment provides a millimeter wave base station, including:

a receiver, configured to receive measurement indication information sent by a cellular base station; and a cellular frequency band processor, configured to perform signal measurement interaction with a user equipment in a cellular frequency band according to the measurement indication information, so that the cellular base station acquires a measurement result, and determines, according to the measurement result, whether the millimeter wave base station is a to-be-accessed millimeter wave base station of the user equipment.

According to a ninth aspect, an embodiment provides a user equipment, including:

a receiver, configured to receive, in a cellular frequency band, measurement indication information sent by a cellular base station; and a processor, configured to perform signal measurement interaction with a millimeter wave base station in the cellular frequency band according to the measurement indication information, so that the cellular base station acquires a measurement result, and determines, according to the measurement result, whether the millimeter wave base station is a to-be-accessed millimeter wave base station of the user equipment; where the receiver is further configured to receive, in the cellular frequency band, millimeter wave frequency band parameter configuration information of the to-be-accessed millimeter wave base station that is sent by the cellular base station, and according to the millimeter wave frequency band parameter configuration information, wake up a millimeter wave frequency band function and access the to-be-accessed millimeter wave base station.

According to a tenth aspect, an embodiment provides a millimeter wave communication system, including: a cellular base station and a millimeter wave base station, where the cellular base station is the cellular base station in the fourth aspect, and the millimeter wave base station is the millimeter wave base station in the fifth aspect.

According to an eleventh aspect, an embodiment provides a millimeter wave communication system, including: a cellular base station and a millimeter wave base station, where the cellular base station is the cellular base station in the seventh aspect, and the millimeter wave base station is the millimeter wave base station in the eighth aspect.

According to the communication method, apparatus, and system in the embodiments of the present disclosure, based on a cellular frequency band transceiver of a millimeter wave base station, a cellular base station controls the millimeter wave base station and a user equipment to perform measurement signal exchange in a cellular frequency band, and determines a to-be-accessed millimeter wave base station of the user equipment according to a measurement result, and further triggers turn-on or wake-up of the millimeter wave base station that is in a sleep state and a millimeter wave frequency band transceiver of the user equipment, so that the user equipment accesses the to-be-accessed millimeter wave base station, which reduces unnecessary inter-frequency cell search and measurement of the user equipment, decreases consumption of battery power of the user equipment, reduces unnecessary measurement signal and pilot signal transmission of the millimeter wave base station, and avoids power consumption, pilot pollution, and a throughput decrease of the millimeter wave base station.

BRIEF DESCRIPTION OF THE DRAWINGS

To describe the technical solutions in the disclosed embodiments or in the prior art more clearly, the following briefly introduces the accompanying drawings required for describing the embodiments or the prior art. Apparently, the accompanying drawings in the following description show some embodiments, and persons of ordinary skill in the art may still derive other drawings from these accompanying drawings without creative efforts.

FIG. 3 is a flowchart of Embodiment 1 of a communication method according to an embodiment;

FIG. 4 is a flowchart of Embodiment 2 of a communication method according to an embodiment;

DETAILED DESCRIPTION OF ILLUSTRATIVE EMBODIMENTS

To describe the embodiments more clearly, before detailed embodiments are described, two network architectures involved in the embodiments are described first.

Figure 1:
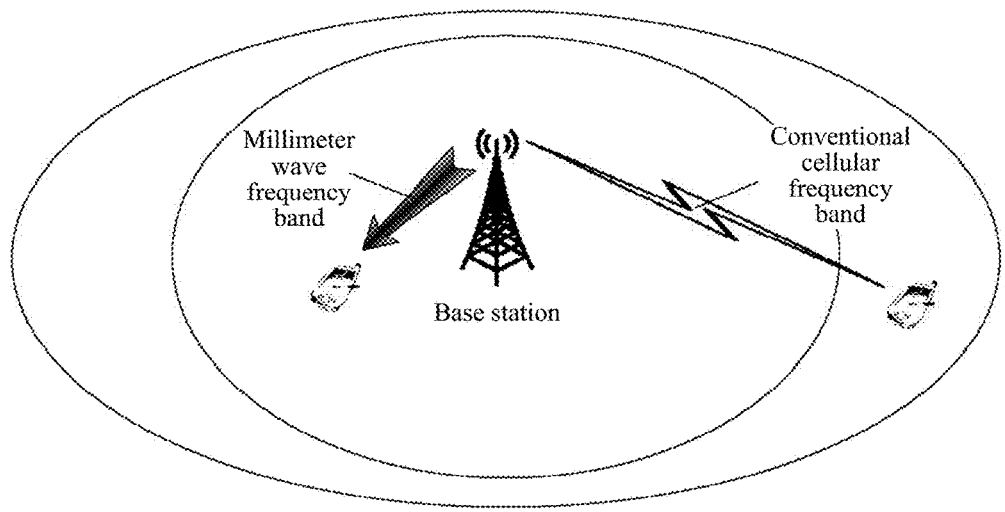
FIG. 1 is a schematic diagram in which a conventional cellular base station and a millimeter wave base station are deployed in a co-site manner.

A first network architecture is as shown in FIG. 1. FIG. 1 is a schematic diagram in which a conventional cellular base station and a millimeter wave base station are deployed in a co-site manner. In this network architecture, the conventional cellular base station and the millimeter wave base station may share one site, that is, a tower, a pole, or the like, to install their respective antennas, or even may share one antenna system. Data exchange between the cellular base station and the millimeter wave base station may be considered as exchange between high-speed circuits, and problems of a delay and a capacity of a backhaul link between the cellular base station and the millimeter wave base station do not need to be considered. In this network architecture, coverage of the millimeter wave base station may be the same as coverage of the cellular base station, for example, the millimeter wave base station and the cellular base station serve as hotspots and cover an area with a radius of 200 meters to 500 meters, but in most scenarios, the coverage of the millimeter wave base station is smaller than the coverage of the cellular base station, for example, the millimeter wave base station serves as a hotspot and covers an area with a radius of 200 meters to 500 meters while the cellular base station covers a larger area with a radius of 1 kilometer to 2 kilometers. A user equipment within the coverage of the millimeter wave base station is certainly within the coverage of the conventional cellular base station that is co-site with the millimeter wave base station. The user equipment within the coverage of the millimeter wave base station may interact with the millimeter wave base station by using a millimeter wave frequency band, or may interact with the conventional cellular base station by using a conventional cellular frequency band. A user equipment beyond the coverage of the millimeter wave base station but within the coverage of the conventional cellular base station can only interact with the conventional cellular base station by using the conventional cellular frequency band. A relatively intuitive physical feature of the network architecture is that, a distance from a user equipment to a millimeter wave base station is the same as a distance from the user equipment to a cellular base station.

Figure 2:
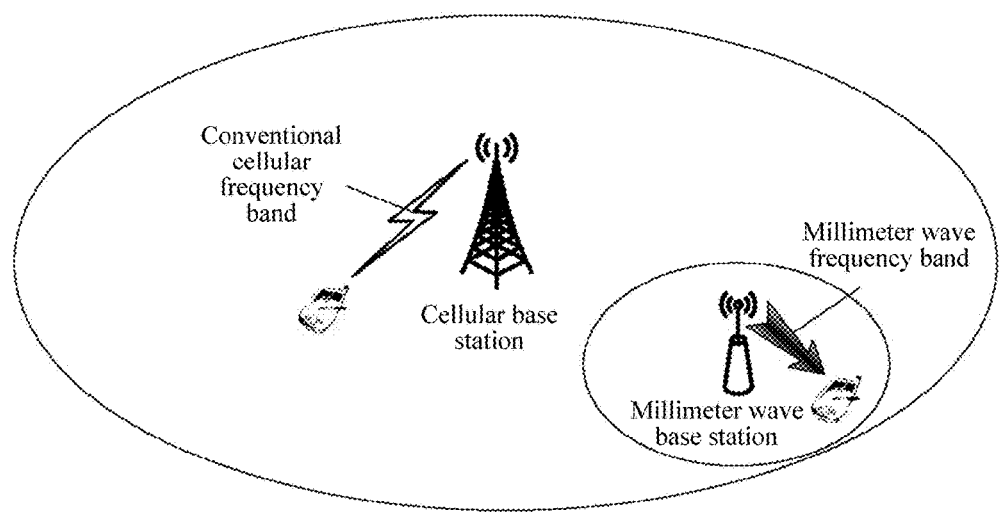
FIG. 2 is a schematic diagram in which a conventional cellular base station and a millimeter wave base station are deployed in a non-co-site manner.

A second network architecture is as shown in FIG. 2. FIG. 2 is a schematic diagram in which a conventional cellular base station and a millimeter wave base station are deployed in a non-co-site manner. In this network architecture, the conventional cellular base station and the millimeter wave base station are installed on different sites, the cellular base station and the millimeter wave base station perform data exchange by using an optical fiber wired backhaul link or a millimeter wave wireless backhaul link. In this network architecture, one or more millimeter wave base stations are within coverage of the conventional cellular base station. A user equipment within coverage of the millimeter wave base station may interact with the millimeter wave base station by using a millimeter wave frequency band, or may interact with the conventional cellular base station by using a conventional cellular frequency band. A user equipment beyond the coverage of the millimeter wave base station but within the coverage of the conventional cellular base station can only interact with the conventional cellular base station by using the conventional cellular frequency band.

Further, in the foregoing two network architectures, control-plane information of a user equipment is exchanged with a cellular base station by using a cellular frequency band, while data-plane information of the user equipment may be exchanged with the cellular base station by using the cellular frequency band, or may be exchanged with a millimeter wave base station by using a millimeter wave frequency band. Therefore, mobility management and radio resource control (RRC) protocol signaling transmission and reception of the user equipment are all performed by interacting with the cellular base station.

To make the objectives, technical solutions, and advantages of the embodiments clearer, the following clearly describes the technical solutions in the embodiments with reference to the accompanying drawings in the embodiments. Apparently, the described embodiments are some but not all of the embodiments. All other embodiments obtained by persons of ordinary skill in the art based on the embodiments without creative efforts shall fall within the protection scope of the present invention.

FIG. 3 is a flowchart of Embodiment 1 of a communication method according an embodiment. As shown in FIG. 3, the method in this embodiment may include:

Step 101: A cellular base station sends measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station.

An application scenario in this embodiment is described as follows: A user equipment is at a coverage edge of a millimeter wave base station, and is in a state of an RRC data connection (RRC_Connected) to a conventional cellular base station. In this case, cell search and measurement of the user equipment are controlled and configured by the cellular base station; the user equipment has not established a connection to the millimeter wave base station, and the millimeter wave base station determines, according to a signal sent by the user equipment in an uplink cellular frequency band, to trigger a measurement operation of the user equipment in a millimeter wave frequency band, so that the user equipment subsequently performs access in the millimeter wave frequency band.

In this embodiment, a millimeter wave base station that the user equipment needs to access is a millimeter wave base station deployed within coverage of the cellular base station. The cellular base station may use all millimeter wave base stations within the coverage of the cellular base station as millimeter wave base stations that a user needs to access; or may use some millimeter wave base stations within the coverage of the cellular base station as millimeter wave base stations that a user needs to access, and a choosing basis may be that, the cellular base station determines a rough location of the user equipment in the coverage of the cellular base station according to measurement information, fed back by the user equipment, in a cellular frequency band, and determines multiple millimeter wave base stations at this location as millimeter wave base stations that the user needs to access. The millimeter wave base station has a cellular frequency band transceiver and can interact with the user equipment in the cellular frequency band, and therefore, the millimeter wave base station may be in a sleep state when serving no user equipment, and only the cellular frequency band transceiver is left to process data that is sent and received in the cellular frequency band.

In this embodiment, the cellular base station sends the measurement indication information to the millimeter wave base station by using a backhaul link, where the backhaul link between the cellular base station and the millimeter wave base station may be implemented in a form of an optical fiber or implemented in a form of a millimeter wave radio link, and an interface of the backhaul link may be an X2 interface defined in the Long Term Evolution (LTE) or may be a newly defined radio interface. The measurement indication information sent by the cellular base station to the millimeter wave base station may include information such as a transmit power, a bandwidth, a subframe configuration, a frequency-domain location, and an antenna configuration of a measurement signal. After receiving the measurement indication information, the millimeter wave base station may receive, on a resource specified in the measurement indication information, a measurement signal sent by the user equipment or send a measurement signal to the user equipment on a resource specified in the measurement indication information.

The user equipment and the cellular base station are in an RRC_Connected state, and therefore, the cellular base station may send the measurement indication information to the user equipment in the cellular frequency band, where the cellular base station may send the measurement indication information by using RRC signaling, and the measurement indication information may include information such as a bandwidth, a subframe configuration, a frequency-domain location, and an antenna configuration of a measurement signal. After receiving the measurement indication information, the user equipment may receive, on a resource specified in the measurement indication information, a measurement signal sent by the millimeter wave base station or send a measurement signal to the millimeter wave base station on a resource specified in the measurement indication information.

According to the received measurement indication information, the millimeter wave base station and the user equipment can perform signal measurement interaction on a cellular frequency band resource specified in the measurement indication information, so as to acquire a measurement result. A process of the interaction may be that, the millimeter wave base station receives, on the specified cellular frequency band resource, a measurement signal sent by the user equipment, and then acquires the measurement result by means of calculation according to a preset algorithm; or may be that, the user equipment receives, on the specified cellular frequency band resource, a measurement signal sent by the millimeter wave base station, and then acquires the measurement result by means of calculation according to a preset algorithm. A specific implementation process is described in a subsequent embodiment.

Step 102: The cellular base station acquires the measurement result, and determines a to-be-accessed millimeter wave base station of the user equipment according to the measurement result.

In this embodiment, the cellular base station acquires the measurement result, where the measurement result may be sent by the millimeter wave base station by using the backhaul link or may be sent by the user equipment in the cellular frequency band, and the cellular base station determines the to-be-accessed millimeter wave base station of the user equipment according to the measurement result in combination with information such as load or interference of the millimeter wave base station and a status of a link between the user equipment and the millimeter wave base station and the like. It should be noted that, one or more to-be-accessed millimeter wave base stations may be determined herein by the cellular base station, because when the cellular base station performs condition-based determining on millimeter wave base stations within the coverage of the cellular base station according to the measurement result in combination with information such as load or interference of the millimeter wave base stations, there may be multiple eligible millimeter wave base stations, and the cellular base station may use all the eligible millimeter wave base stations as to-be-accessed millimeter wave base stations of the user equipment.

A coarse millimeter wave base station screening process is performed based on the coverage of the cellular base station, and as long as a millimeter wave base station is at the rough location of the user equipment, the millimeter wave base station can be determined as a millimeter wave base station that the user needs to access, or even all the millimeter wave base stations within the coverage of the cellular base station may be determined as millimeter wave base stations that the user needs to access. Further, in step 102, the millimeter wave base station is determined according to the measurement result, acquired by means of signal measurement interaction between the millimeter wave base station and the user equipment, in combination with the information such as load or interference of the millimeter wave base station and the status of the link between the user equipment and the millimeter wave base station and the like.

Step 103: The cellular base station sends millimeter wave frequency band parameter configuration information of the to-be-accessed millimeter wave base station to the user equipment, so that the user equipment accesses the to-be-accessed millimeter wave base station according to the millimeter wave frequency band parameter configuration information.

In this embodiment, the cellular base station sends, to the user equipment, the millimeter wave frequency band parameter configuration information of the to-be-accessed millimeter wave base station that is determined in step 102, where the millimeter wave frequency band parameter configuration information may include information such as identification information of the one or more to-be-accessed millimeter wave base stations and a millimeter wave frequency band measurement pilot configuration of each to-be-accessed millimeter wave base station. After successfully receiving the millimeter wave frequency band parameter configuration information sent by the cellular base station, the user equipment turns on or wakes up a millimeter wave frequency band transceiver of the user equipment, and receives or sends a corresponding measurement pilot signal on a configured millimeter wave frequency band resource, so as to perform a millimeter wave frequency band measurement and access process. Finally, the user equipment accesses one millimeter wave base station in all the to-be-accessed millimeter wave base stations, where the accessed millimeter wave base station may be any one of the to-be-accessed millimeter wave base stations, which is specifically determined by an access process of the user equipment, and is not specifically limited herein.

According to this embodiment, based on a cellular frequency band transceiver of a millimeter wave base station, a cellular base station controls the millimeter wave base station and a user equipment to perform measurement signal exchange in a cellular frequency band, and determines a to-be-accessed millimeter wave base station of the user equipment according to a measurement result, and further triggers turn-on or wake-up of the millimeter wave base station that is in a sleep state and a millimeter wave frequency band transceiver of the user equipment, so that the user equipment accesses the to-be-accessed millimeter wave base station, which reduces unnecessary inter-frequency cell search and measurement of the user equipment, decreases consumption of battery power of the user equipment, reduces unnecessary measurement signal and pilot signal transmission of the millimeter wave base station, and avoids power consumption, pilot pollution, and a throughput decrease of the millimeter wave base station.

Further, in this embodiment, a specific implementation method of step 101 in which the cellular base station sends the measurement indication information to the millimeter wave base station and the user equipment, so that the millimeter wave base station and the user equipment perform signal measurement interaction in the cellular frequency band according to the measurement indication information to acquire the measurement result may be: sending, by the cellular base station, first measurement indication information to the millimeter wave base station and sending second measurement indication information to the user equipment, where the first measurement indication information is used for instructing the millimeter wave base station to receive, in the cellular frequency band according to the first measurement indication information, a measurement signal that is sent by the user equipment in the cellular frequency band, and the second measurement indication information is used for instructing the user equipment to send the measurement signal to the millimeter wave base station in the cellular frequency band according to the second measurement indication information. That is, the cellular base station respectively sends the first measurement indication information to the determined millimeter wave base station and sends the second measurement indication information to the user equipment, so that the millimeter wave base station receives, in the cellular frequency band according to the first measurement indication information, the measurement signal that is sent by the user equipment in the cellular frequency band, and the user equipment sends the measurement signal to the millimeter wave base station in the cellular frequency band according to the second measurement indication information. In this case, uplink data sending is performed between the millimeter wave base station and the user equipment, and therefore, the measurement indication information sent by the cellular base station is used for indicating an uplink resource configuration of the millimeter wave base station and the user equipment in the cellular frequency band, the user equipment sends the measurement signal by using an uplink resource, and the millimeter wave base station receives the measurement signal on the corresponding uplink resource. The measurement signal may be a sounding reference signal (SRS) defined in the LTE. In a co-site network architecture, the SRS can meet a design requirement, and can avoid additional work of measurement signal redesign. For a non-co-site network architecture, the measurement signal from the user equipment to the millimeter wave base station needs to be transmitted on another symbol, the SRS cannot meet the design requirement, and a new measurement signal needs to be introduced, to ensure that one or more millimeter wave base stations within coverage of one cellular base station can detect and distinguish measurement signals sent by different user equipments, where an implementation method of the new measurement signal is not limited in this embodiment.

Correspondingly, in this embodiment, a specific implementation method of step 102 in which the cellular base station acquires the measurement result may be: receiving, by the cellular base station, a first measurement result sent by the millimeter wave base station, where the first measurement result is obtained by the millimeter wave base station according to the measurement signal sent by the user equipment. According to the measurement indication information sent by the cellular base station, the millimeter wave base station receives the measurement signal sent by the user equipment, and acquires the first measurement result by means of calculation according to the measurement signal. A specific calculation method is described in a subsequent embodiment.

Further, in this embodiment, a specific implementation method of step 101 in which the cellular base station sends the measurement indication information to the millimeter wave base station and the user equipment, so that the millimeter wave base station and the user equipment perform signal measurement interaction in the cellular frequency band according to the measurement indication information to acquire a measurement result may be: sending, by the cellular base station, third measurement indication information to the millimeter wave base station and sending fourth measurement indication information to the user equipment, where the third measurement indication information is used for instructing the millimeter wave base station to send a measurement signal to the user equipment in the cellular frequency band according to the third measurement indication information, and the fourth measurement indication information is used for instructing the user equipment to receive, in the cellular frequency band according to the fourth measurement indication information, the measurement signal that is sent by the millimeter wave base station in the cellular frequency band. That is, the cellular base station respectively sends the third measurement indication information to the determined millimeter wave base station and sends the fourth measurement indication information to the user equipment, so that the user equipment receives, in the cellular frequency band according to the fourth measurement indication information, the measurement signal that is sent by the millimeter wave base station in the cellular frequency band, and the millimeter wave base station sends the measurement signal to the user equipment in the cellular frequency band according to the third measurement indication information. In this case, downlink data sending is performed between the millimeter wave base station and the user equipment, and therefore, the measurement indication information sent by the cellular base station is used for indicating a downlink resource configuration of the millimeter wave base station and the user equipment in the cellular frequency band, the millimeter wave base station sends the measurement signal by using a downlink resource, and the user equipment receives the measurement signal on the corresponding downlink resource. The measurement signal may be a channel state indication reference signal (CSI-RS), a common reference signal (CRS), or a positioning reference signal (PRS) defined in the LTE.

Correspondingly, in this embodiment, a specific implementation method of step 102 in which the cellular base station acquires the measurement result may be: receiving, by the cellular base station, a second measurement result sent by the user equipment, where the second measurement result is obtained by the user equipment according to the measurement signal sent by the millimeter wave base station. According to the measurement indication information sent by the cellular base station, the user equipment receives the measurement signal sent by the millimeter wave base station, and acquires the second measurement result by means of calculation according to the measurement signal. A specific calculation method is described in a subsequent embodiment. Because the second measurement result is sent by the user equipment to the cellular base station, a difference between a second measurement signal and a first measurement signal lies in that, the first measurement result further includes load information and/or an interference indication of the millimeter wave base station. Therefore, herein, a specific implementation method for determining, by the cellular base station, the to-be-accessed millimeter wave base station of the user equipment according to the measurement result is determining, by the cellular base station, the to-be-accessed millimeter wave base station of the user equipment according to the second measurement result and the load information and/or the interference indication of the millimeter wave base station.

FIG. 4 is a flowchart of Embodiment 2 of a communication method according to an embodiment. As shown in FIG. 4, based on the method embodiment shown in FIG. 3, before step 103, the method in this embodiment may further include:

Step 201: The cellular base station determines whether the to-be-accessed millimeter wave base station is in a working state.

In this embodiment, after the cellular base station determines the to-be-accessed millimeter wave base station of the user equipment, the to-be-accessed millimeter wave base station may have two states: one is that the to-be-accessed millimeter wave base station currently serves at least one user equipment and is in a working state, and periodically sends a measurement pilot signal in the millimeter wave frequency band; and the other is that the to-be-accessed millimeter wave base station currently serves no user equipment and is in an off or sleep state, and does not send any signal in the millimeter wave frequency band. The cellular base station updates states of all the millimeter wave base stations within the coverage in time. For example, the cellular base station may maintain a millimeter wave base station state table, and once a state of a millimeter wave base station changes, which, for example, may switch from a working state to a sleep state or may switch from a sleep state to a working state, the millimeter wave base station sends state change information to the cellular base station by using the backhaul link, and the cellular base station updates content of the state table according to the state change information. The cellular base station determines, according to a record of the state table, whether the to-be-accessed millimeter wave base station of the user equipment is in a working state.

Step 202: If not, the cellular base station sends a wake-up instruction to the to-be-accessed millimeter wave base station, and after the to-be-accessed millimeter wave base station is waken up, sends the millimeter wave frequency band parameter configuration information to the to-be-accessed millimeter wave base station; or the cellular base station sends a wake-up instruction to the to-be-accessed millimeter wave base station, and after the to-be-accessed millimeter wave base station is waken up, receives the millimeter wave frequency band parameter configuration information sent by the millimeter wave base station.

In this embodiment, if the to-be-accessed millimeter wave base station is in a working state, the cellular base station has stored millimeter wave frequency band parameter configuration information corresponding to the millimeter wave base station, and therefore, the millimeter wave base station can directly perform step 103 in the embodiment shown in FIG. 3, to send the millimeter wave frequency band parameter configuration information of the to-be-accessed millimeter wave base station to the user equipment, so that the user equipment accesses the to-be-accessed millimeter wave base station according to the millimeter wave frequency band parameter configuration information.

If the to-be-accessed millimeter wave base station is not in a working state, the cellular base station first needs to send a wake-up instruction to the millimeter wave base station, so that the millimeter wave base station changes a state according to the wake-up instruction, wakes up from a sleep state, and switches to the working state, that is, the millimeter wave base station starts to transmit a measurement signal and a pilot signal in the millimeter wave frequency band. Then the cellular base station sends the millimeter wave frequency band parameter configuration information to the to-be-accessed millimeter wave base station; or if the millimeter wave base station has stored the millimeter wave frequency band parameter configuration information, the millimeter wave base station may send the millimeter wave frequency band parameter configuration information to the cellular base station. The millimeter wave base station sends and receives a measurement pilot signal on a corresponding resource according to the millimeter wave frequency band parameter configuration information, so that the user equipment accesses the to-be-accessed millimeter wave base station according to the millimeter wave frequency band parameter configuration information.

According to this embodiment, a cellular base station determines a state of a to-be-accessed millimeter wave base station, and wakes up a millimeter wave base station that is in a sleep state, so that the millimeter wave base station changes a state and transmits a measurement signal and a pilot signal in a millimeter wave frequency band, which reduces unnecessary measurement signal and pilot signal transmission of the millimeter wave base station, and avoids power consumption, pilot pollution, and a throughput decrease of the millimeter wave base station.

Figure 5:
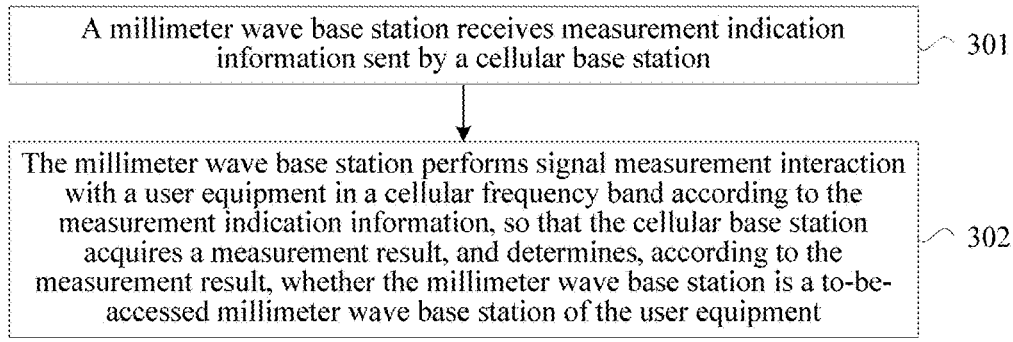
FIG. 5 is a flowchart of Embodiment 3 of a communication method according to an embodiment.

FIG. 5 is a flowchart of Embodiment 3 of a communication method according to an embodiment. As shown in FIG. 5, the method in this embodiment may include:

Step 301: A millimeter wave base station receives measurement indication information sent by a cellular base station.

In this embodiment, the millimeter wave base station receives, by using a backhaul link, the measurement indication information sent by the cellular base station, where the backhaul link may be implemented in a form of an optical fiber or implemented in a form of a millimeter wave radio link, and an interface of the backhaul link may be an X2 interface defined in the LTE or may be a newly defined radio interface. The measurement indication information may include information such as a transmit power, a bandwidth, a subframe configuration, a frequency-domain location, and an antenna configuration of a measurement signal. The millimeter wave base station has a cellular frequency band transceiver and can interact with a user equipment in a cellular frequency band, and therefore, the millimeter wave base station may be in a sleep state when serving no user equipment, and only the cellular frequency band transceiver is left to process data that is sent and received in the cellular frequency band.

Step 302: The millimeter wave base station performs signal measurement interaction with a user equipment in a cellular frequency band according to the measurement indication information, so that the cellular base station acquires a measurement result, and determines, according to the measurement result, whether the millimeter wave base station is a to-be-accessed millimeter wave base station of the user equipment.

In this embodiment, according to the measurement indication information, the millimeter wave base station may receive, on a resource specified in the measurement indication information, a measurement signal sent by the user equipment or send a measurement signal to the user equipment on a resource specified in the measurement indication information. The millimeter wave base station performs signal measurement interaction with the user equipment, so that the cellular base station acquires a measurement result to determine whether the millimeter wave base station is a to-be-accessed millimeter wave base station of the user equipment.

According to this embodiment, based on a cellular frequency band transceiver of a millimeter wave base station, the millimeter wave base station performs measurement signal exchange with a user equipment in a cellular frequency band to acquire a measurement result, so that a cellular base station determines, according to the measurement result, whether the millimeter wave base station is a to-be-accessed millimeter wave base station of the user equipment, which reduces unnecessary inter-frequency cell search and measurement of the user equipment, decreases consumption of battery power of the user equipment, reduces unnecessary measurement signal and pilot signal transmission of the millimeter wave base station, and avoids power consumption, pilot pollution, and a throughput decrease of the millimeter wave base station.

Further, in the method embodiment shown in FIG. 5, a specific implementation method of step 301 in which the millimeter wave base station receives the measurement indication information sent by the cellular base station may be: receiving, by the millimeter wave base station, first measurement indication information sent by the cellular base station, where the first measurement indication information is used for instructing the millimeter wave base station to receive, in the cellular frequency band according to the first measurement indication information, a measurement signal that is sent by the user equipment in the cellular frequency band. That is, the measurement indication information received by the millimeter wave base station is the first measurement indication information, and the information is used for instructing the millimeter wave base station to receive, in the cellular frequency band, the measurement signal that is sent by the user equipment in the cellular frequency band.

Figure 6:
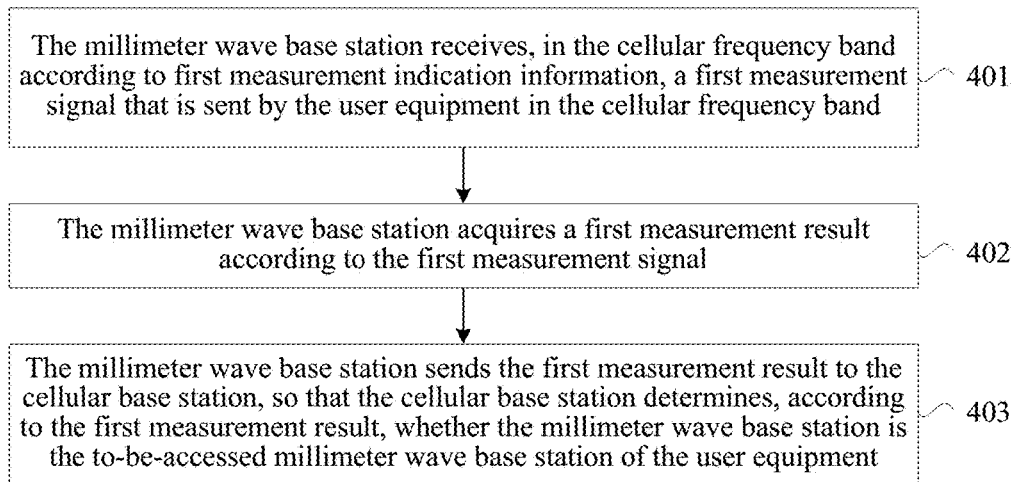
FIG. 6 is a flowchart of Embodiment 4 of a communication method according to an embodiment.

Correspondingly, FIG. 6 is a flowchart of Embodiment 4 of a communication method according to an embodiment. As shown in FIG. 6, based on the foregoing specific implementation method of step 301 and based on the method embodiment shown in FIG. 5, a specific implementation method of step 302 in which the millimeter wave base station performs signal measurement interaction with the user equipment in the cellular frequency band according to the measurement indication information, so that the cellular base station acquires the measurement result, and determines, according to the measurement result, whether the millimeter wave base station is the to-be-accessed millimeter wave base station of the user equipment may include:

Step 401: The millimeter wave base station receives, in the cellular frequency band according to the first measurement indication information, a first measurement signal that is sent by the user equipment in the cellular frequency band.

In this embodiment, the millimeter wave base station receives, according to the first measurement indication information, the measurement signal sent by the user equipment, that is, the first measurement indication information instructs the millimeter wave base station to receive data on a corresponding uplink resource, where the data is the first measurement signal.

Step 402: The millimeter wave base station acquires a first measurement result according to the first measurement signal.

In this embodiment, a method for acquiring the measurement result by means of calculation by the millimeter wave base station varies according to different specific information included in the first measurement signal, and correspondingly, information included in the acquired first measurement result is not completely the same.

Specifically, if the first measurement signal includes a transmit power at which the user equipment sends the first measurement signal, the millimeter wave base station acquires a loss value of a path from the user equipment to the millimeter wave base station in the cellular frequency band by means of calculation according to the transmit power and a receive power at which the millimeter wave base station receives the first measurement signal; and if the path loss value is less than or equal to a first preset path loss threshold, the millimeter wave base station uses the path loss value and load information and/or an interference indication of the millimeter wave base station as the first measurement result. The millimeter wave base station may calculate a loss $PL_{low}$ of a cellular frequency band path from the user equipment to the millimeter wave base station according to the transmit power of the first measurement signal sent by the user equipment and the receive power at which the first measurement signal is received. According to an actual system design requirement, the cellular frequency band path loss $PL_{low}$ may be used as a determining basis, and if $PL_{low}$ is less than or equal to a first preset path loss threshold $PL_{low\_th}$, the millimeter wave base station uses the path loss value and the load information and/or the interference indication of the millimeter wave base station as the first measurement result. In addition, a millimeter wave frequency band path loss $PL_{hi}$ may also be first estimated according to the cellular frequency band path loss $PL_{low}$, and then the millimeter wave frequency band path loss $PL_{hi}$ is used as a determining basis, where the millimeter wave frequency band path loss $PL_{hi}$ may be obtained by means of calculation according to a formula (1):

$$PL_{hi}=b+20\ \log_{10}(f)+PL_{low} \quad (1)$$

where $PL_{hi}$ represents the millimeter wave frequency band path loss, b represents a statistic constant and may be pre-configured, and f represents a millimeter wave carrier frequency.

If $PL_{hi}$ is less than or equal to a particular millimeter wave frequency band path loss threshold $PL_{hi\_th}$, the millimeter wave base station uses the path loss value and the load information and/or the interference indication of the millimeter wave base station as the first measurement result.

Further, if the first measurement signal includes an absolute sending time at which the user equipment sends the first measurement signal, the millimeter wave base station acquires a delay of transmission from the user equipment to the millimeter wave base station in the cellular frequency band by means of calculation according to the absolute sending time and an absolute receiving time at which the millimeter wave base station receives the first measurement signal; and if the transmission delay is less than or equal to a first preset transmission delay threshold, the millimeter wave base station uses the transmission delay and load information and/or an interference indication of the millimeter wave base station as the first measurement result. The absolute sending time may be a Global Positioning System (GPS) time at which the user equipment sends the first measurement signal, that is, the user equipment acquires a time from a GPS module when the user equipment sends the first measurement signal, and uses the GPS time as the first measurement signal and sends the first measurement signal to the millimeter wave base station. The millimeter wave base station may acquire a receiving time from the GPS module when the millimeter wave base station receives the first measurement signal, and may further obtain a delay of transmission of the first measurement signal from the user equipment to the millimeter wave base station. If the transmission delay is less than or equal to the first preset transmission delay threshold, the millimeter wave base station uses the transmission delay and the load information and/or the interference indication of the millimeter wave base station as the first measurement result.

Further, if the first measurement signal includes positioning information of the user equipment, the millimeter wave base station acquires geographical location information of the user equipment according to the positioning information, and acquires a distance from the user equipment to the millimeter wave base station by means of calculation according to the geographical location information; and if the distance is less than or equal to a preset distance threshold, the millimeter wave base station uses the distance and load information and/or an interference indication of the millimeter wave base station as the first measurement result. The millimeter wave base station acquires a physical location of the user equipment according to the received first measurement signal by using a positioning technology of timing of arrival (TOA) or timing difference of arrival (TDOA) or the like, and then calculates the distance from the user equipment to the millimeter wave base station. If the distance from the user equipment to the millimeter wave base station is less than or equal to the preset distance threshold, the millimeter wave base station uses the distance and the load information and/or the interference indication of the millimeter wave base station as the first measurement result.

Step 403: The millimeter wave base station sends the first measurement result to the cellular base station, so that the cellular base station determines, according to the first measurement result, whether the millimeter wave base station is the to-be-accessed millimeter wave base station of the user equipment.

In this embodiment, the millimeter wave base station compares a calculation result with a preset threshold according to specific information included in the first measurement signal, and an eligible millimeter wave base station uses the calculation result and load information and/or an interference indication of the eligible millimeter wave base station as the first measurement result, and sends the first measurement result to the cellular base station, so that the cellular base station determines, according to the first measurement result, whether the millimeter wave base station is the to-be-accessed millimeter wave base station of the user equipment.

Further, in the method embodiment shown in FIG. 5, a specific implementation method of step 301 in which the millimeter wave base station receives the measurement indication information sent by the cellular base station may be: receiving, by the millimeter wave base station, third measurement indication information sent by the cellular base station, where the third measurement indication information is used for instructing the millimeter wave base station to send a measurement signal to the user equipment in the cellular frequency band according to the third measurement indication information. That is, the measurement indication information received by the millimeter wave base station is the third measurement indication information, and the information is used for instructing the millimeter wave base station to send the measurement signal to the user equipment in the cellular frequency band. The measurement signal may include: a transmit power, an absolute sending time, or positioning indication information.

Correspondingly, in the method embodiment shown in FIG. 5, a specific implementation method of step 302 in which the millimeter wave base station performs signal measurement interaction with the user equipment in the cellular frequency band according to the measurement indication information, so that the cellular base station acquires the measurement result, and determines, according to the measurement result, whether the millimeter wave base station is the to-be-accessed millimeter wave base station of the user equipment may be: sending, by the millimeter wave base station, a second measurement signal to the user equipment in the cellular frequency band according to the third measurement indication information, so that the user equipment acquires a second measurement result by means of calculation according to the second measurement signal.

Figure 7:
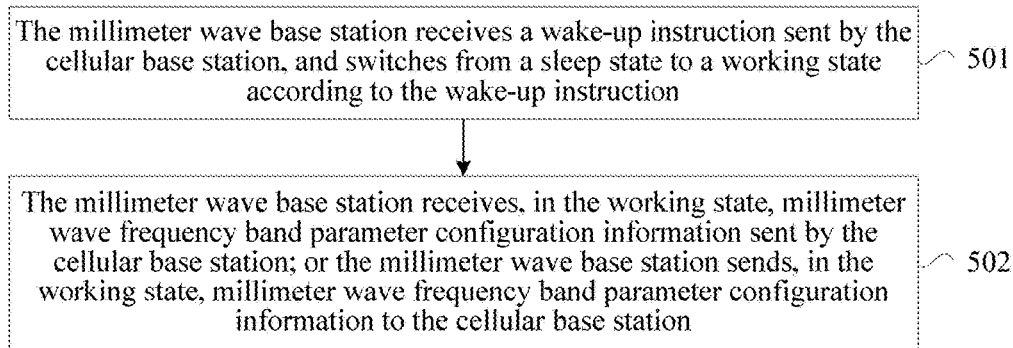
FIG. 7 is a flowchart of Embodiment 5 of a communication method according to an embodiment.

FIG. 7 is a flowchart of Embodiment 5 of a communication method according to an embodiment. As shown in FIG. 7, based on the method embodiment shown in FIG. 5, after step 302, the method in this embodiment may further include:

Step 501: The millimeter wave base station receives a wake-up instruction sent by the cellular base station, and switches from a sleep state to a working state according to the wake-up instruction.

In this embodiment, if the millimeter wave base station is in a sleep state, only the cellular frequency band transceiver of the millimeter wave base station is in a working state, if the cellular base station determines the millimeter wave base station as the to-be-accessed millimeter wave base station of the user equipment, the cellular base station first needs to send a wake-up instruction to the millimeter wave base station, and after receiving the wake-up instruction, the millimeter wave base station switches from the sleep state to a working state according to the instruction, that is, the millimeter wave base station starts to send pilot information in the millimeter wave frequency band.

Step 502: The millimeter wave base station receives, in the working state, millimeter wave frequency band parameter configuration information sent by the cellular base station; or the millimeter wave base station sends, in the working state, millimeter wave frequency band parameter configuration information to the cellular base station.

In this embodiment, the millimeter wave base station may receive, in the working state, the millimeter wave frequency band parameter configuration information sent by the cellular base station, or if the millimeter wave base station has pre-stored related configuration information, the millimeter wave base station may send the millimeter wave frequency band parameter configuration information to the cellular base station, and the cellular base station sends the millimeter wave frequency band parameter configuration information to the user equipment.

According to this embodiment, a millimeter wave base station in a sleep state receives a wake-up instruction and switches from the sleep state to a working state, so that a user equipment accesses the millimeter wave base station in a millimeter wave frequency band, which reduces unnecessary measurement signal and pilot signal transmission of the millimeter wave base station, and avoids power consumption, pilot pollution, and a throughput decrease of the millimeter wave base station.

Figure 8:
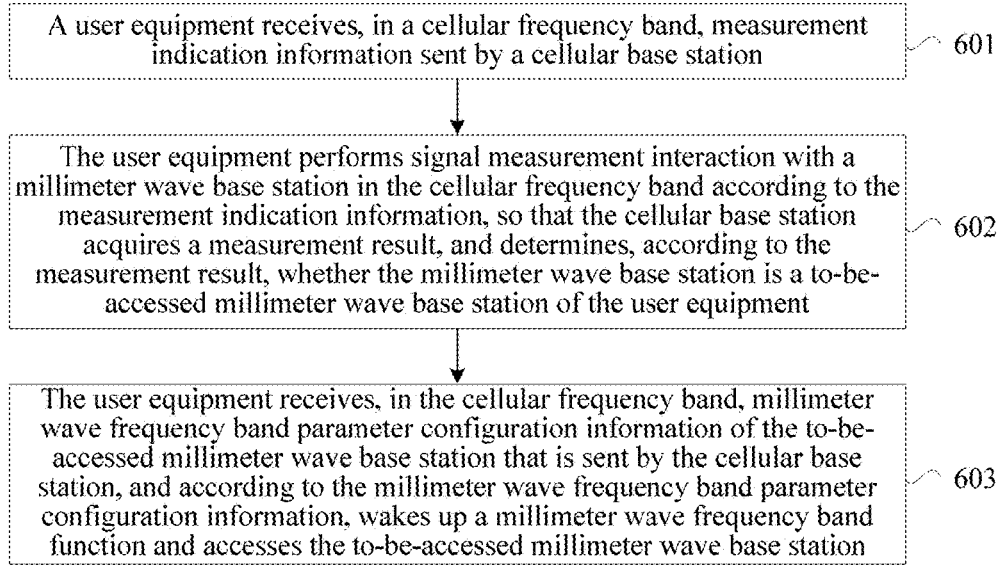
FIG. 8 is a flowchart of Embodiment 6 of a communication method according to an embodiment.

FIG. 8 is a flowchart of Embodiment 6 of a communication method according to an embodiment. As shown in FIG. 8, the method in this embodiment may include:

Step 601: A user equipment receives, in a cellular frequency band, measurement indication information sent by a cellular base station.

In this embodiment, the user equipment receives, in the cellular frequency band, the measurement indication information sent by the cellular base station, where the information may be RRC signaling, and may include information such as a bandwidth, a subframe configuration, a frequency-domain location, and an antenna configuration of a measurement signal.

Step 602: The user equipment performs signal measurement interaction with a millimeter wave base station in the cellular frequency band according to the measurement indication information, so that the cellular base station acquires a measurement result, and determines, according to the measurement result, whether the millimeter wave base station is a to-be-accessed millimeter wave base station of the user equipment.

In this embodiment, according to the measurement indication information, the user equipment may receive, on a cellular frequency band resource specified in the measurement indication information, a measurement signal sent by the millimeter wave base station or send a measurement signal to the millimeter wave base station on a cellular frequency band resource specified in the measurement indication information. The user equipment performs signal measurement interaction with the millimeter wave base station, so that the cellular base station acquires a measurement result to determine whether the millimeter wave base station is a to-be-accessed millimeter wave base station of the user equipment.

Step 603: The user equipment receives, in the cellular frequency band, millimeter wave frequency band parameter configuration information of the to-be-accessed millimeter wave base station that is sent by the cellular base station, and according to the millimeter wave frequency band parameter configuration information, wakes up a millimeter wave frequency band function and accesses the to-be-accessed millimeter wave base station.

In this embodiment, the user equipment receives, in the cellular frequency band, the millimeter wave frequency band parameter configuration information of the millimeter wave base station that is sent by the cellular base station, and according to the information, the user equipment may wake up the millimeter wave frequency band function and send a measurement signal on a specified resource to access the millimeter wave base station.

According to this embodiment, a user equipment performs measurement signal exchange with a millimeter wave base station in a cellular frequency band to acquire a measurement result, so that a cellular base station determines, according to the measurement result, whether the millimeter wave base station is a to-be-accessed millimeter wave base station of the user equipment, and the user equipment accesses the millimeter wave base station according to millimeter wave frequency band parameter configuration information, which reduces unnecessary inter-frequency cell search and measurement of the user equipment, decreases consumption of battery power of the user equipment, reduces unnecessary measurement signal and pilot signal transmission of the millimeter wave base station, and avoids power consumption, pilot pollution, and a throughput decrease of the millimeter wave base station.

Further, in the method embodiment shown in FIG. 8, a specific implementation method of step 601 in which the user equipment receives, in the cellular frequency band, the measurement indication information sent by the cellular base station may be: receiving, by the user equipment in the cellular frequency band, fourth measurement indication information that is sent by the cellular base station in the cellular frequency band, where the fourth measurement indication information is used for instructing the user equipment to receive, in the cellular frequency band according to the fourth measurement indication information, a measurement signal that is sent by the millimeter wave base station in the cellular frequency band. That is, the measurement indication information received by the user equipment is the fourth measurement indication information, and the information is used for instructing the user equipment to receive, in the cellular frequency band, the measurement signal that is sent by the millimeter wave base station in the cellular frequency band.

Figure 9:
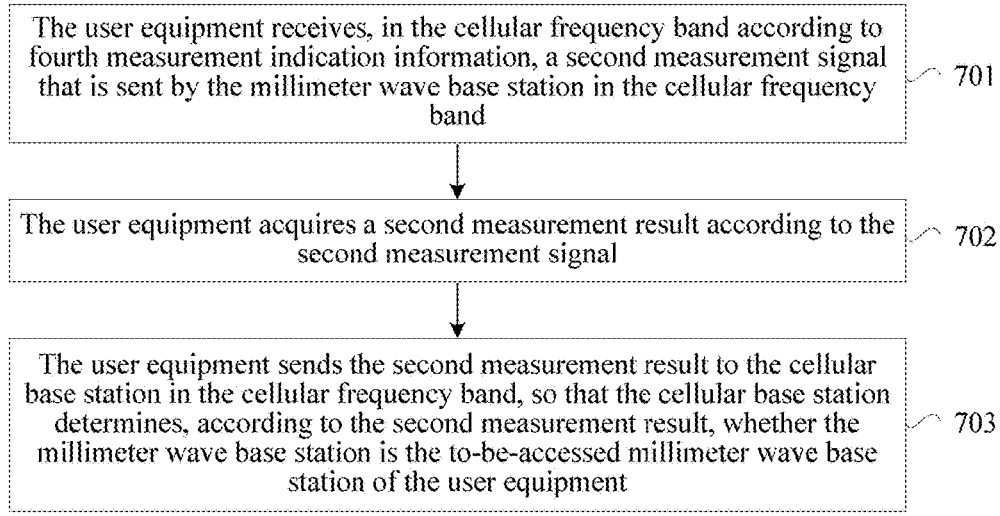
FIG. 9 is a flowchart of Embodiment 7 of a communication method according to an embodiment.

Correspondingly, FIG. 9 is a flowchart of Embodiment 7 of a communication method according to an embodiment. As shown in FIG. 9, based on the foregoing specific implementation method of step 601 and based on the method embodiment shown in FIG. 8, a specific implementation method of step 602 in which the user equipment performs signal measurement interaction with the millimeter wave base station in the cellular frequency band according to the measurement indication information, so that the cellular base station acquires the measurement result, and determines, according to the measurement result, whether the millimeter wave base station is the to-be-accessed millimeter wave base station of the user equipment may include:

Step 701: The user equipment receives, in the cellular frequency band according to the fourth measurement indication information, a second measurement signal that is sent by the millimeter wave base station in the cellular frequency band.

In this embodiment, the user equipment receives, according to the fourth measurement indication information, the measurement signal sent by the millimeter wave base station, that is, the fourth measurement indication information instructs the user equipment to receive data on a corresponding downlink resource, where the data is the second measurement signal.

Step 702: The user equipment acquires a second measurement result according to the second measurement signal.

In this embodiment, a method for acquiring the measurement result by means of calculation by the user equipment varies according to different specific information included in the second measurement signal, and correspondingly, information included in the acquired second measurement result is not completely the same.

Specifically, if the second measurement signal includes a transmit power at which the millimeter wave base station sends the second measurement signal, the user equipment acquires a loss value of a path from the millimeter wave base station to the user equipment in the cellular frequency band by means of calculation according to the transmit power and a receive power at which the user equipment receives the second measurement signal; and if the path loss value is less than or equal to a second preset path loss threshold, the user equipment uses the path loss value as the second measurement result. The user equipment may calculate a loss $PL_{low}$ of a cellular frequency band path from the millimeter wave base station to the user equipment according to the transmit power of the second measurement signal sent by the millimeter wave base station and the receive power at which the second measurement signal is received. According to an actual system design requirement, the cellular frequency band path loss $PL_{low}$ may be used as a determining basis, and if $PL_{low}$ is less than or equal to a second preset path loss threshold $PL_{low\_th}$, the user equipment uses the path loss value as the second measurement result. To reduce an uplink overhead of the cellular frequency band, the user equipment may periodically report second measurement results of M millimeter wave base stations with minimum cellular frequency band path losses $PL_{low}$.

In addition, a millimeter wave frequency band path loss $PL_{hi}$ may also be first estimated according to the cellular frequency band path loss $PL_{low}$, and then the millimeter wave frequency band path loss $PL_{hi}$ is used as a determining basis, where the millimeter wave frequency band path loss $PL_{hi}$ may be obtained by means of calculation according to a formula (1):

$$PL_{hi}=b+20\ \log_{10}(f)+PL_{low} \qquad (1)$$

where $PL_{hi}$ represents the millimeter wave frequency band path loss, b represents a statistic constant and may be pre-configured, and f represents a millimeter wave carrier frequency.

If $PL_{hi}$ is less than or equal to a particular millimeter wave frequency band path loss threshold $PL_{hi\_th}$, the user equipment uses the path loss value as the second measurement result. To reduce an uplink overhead of the cellular frequency band, the user equipment may periodically report second measurement results of M millimeter wave base stations with minimum millimeter wave frequency band path losses $PL_{hi}$.

Further, if the second measurement signal includes a transmit power at which the millimeter wave base station sends the second measurement signal, the user equipment acquires a reference signal received power of the second measurement signal according to the second measurement signal; and if the reference signal received power is greater than or equal to a preset reference signal received power threshold, the user equipment uses the reference signal received power as the second measurement result. The user equipment may learn the reference signal received power (RSRP) of the second measurement signal according to the receive power at which the second measurement signal is received, and if the RSRP is greater than or equal to the preset reference signal received power threshold, the user equipment uses the RSRP as the second measurement result. To reduce an uplink overhead of the cellular frequency band, the user equipment may periodically report second measurement results of M millimeter wave base stations with maximum RSRPs.

Further, if the second measurement signal includes an absolute sending time at which the millimeter wave base station sends the second measurement signal, the user equipment acquires a delay of transmission from the millimeter wave base station to the user equipment in the cellular frequency band by means of calculation according to the absolute sending time and an absolute receiving time at which the user equipment receives the second measurement signal; and if the transmission delay is less than or equal to a second preset transmission delay threshold, the user equipment uses the transmission delay as the second measurement result. The absolute sending time may be a GPS at which the millimeter wave base station sends the second measurement signal, that is, the millimeter wave base station acquires a time from a GPS module when the millimeter wave base station sends the second measurement signal, and uses the GPS time as the second measurement signal and sends the second measurement signal to the user equipment. The user equipment may acquire a receiving time from the GPS module when the user equipment receives the second measurement signal, and may further obtain a delay of transmission of the second measurement signal from the millimeter wave base station to the user equipment. If the transmission delay is less than or equal to the second preset transmission delay threshold, the user equipment uses the transmission delay as the second measurement result. To reduce an uplink overhead of the cellular frequency band, the user equipment may periodically report second measurement results of M millimeter wave base stations with minimum transmission delays.

Further, if the second measurement signal includes positioning indication information sent by the millimeter wave base station, the user equipment acquires positioning information, corresponding to the millimeter wave base station, of the user equipment according to the positioning indication information; and the user equipment uses the positioning information as the second measurement result. The user equipment acquires a related positioning parameter according to the measurement indication information sent by the millimeter wave base station, that is, acquires TOA parameters and/or relative time difference (RTD) parameters corresponding to multiple millimeter wave base stations, and the user equipment uses the TOA parameters and/or the RTD parameters as the second measurement result. The cellular base station may calculate a physical location of the user equipment according to the TOA parameters and/or the RTD parameters sent by the user equipment, and may determine, according to information about the physical location, whether a subsequent millimeter wave frequency band measurement and access process needs to be triggered, and if yes, select one or more millimeter wave base stations as to-be-accessed millimeter wave base stations that establish connections to the user equipment.

Step 703: The user equipment sends the second measurement result to the cellular base station in the cellular frequency band, so that the cellular base station determines, according to the second measurement result, whether the millimeter wave base station is the to-be-accessed millimeter wave base station of the user equipment.

In this embodiment, the user equipment compares a calculation result with a preset threshold according to specific information included in the second measurement signal, uses a measurement result corresponding to an eligible millimeter wave base station as the second measurement result, and sends the second measurement result to the cellular base station, so that the cellular base station determines, according to the second measurement result, whether the millimeter wave base station is the to-be-accessed millimeter wave base station of the user equipment.

Further, in the method embodiment shown in FIG. 8, a specific implementation method of step 601 in which the user equipment receives, in the cellular frequency band, the measurement indication information sent by the cellular base station may be: receiving, by the user equipment in the cellular frequency band, second measurement indication information that is sent by the cellular base station in the cellular frequency band, where the second measurement indication information is used for instructing the user equipment to send a measurement signal to the millimeter wave base station in the cellular frequency band according to the second measurement indication information. That is, the measurement indication information received by the user equipment is the second measurement indication information, and the information is used for instructing the user equipment to send the measurement signal to the millimeter wave base station in the cellular frequency band. The measurement signal may include: a transmit power, an absolute sending time, or positioning information.

Correspondingly, in the method embodiment shown in FIG. 8, a specific implementation method of step 602 in which the user equipment performs signal measurement interaction with the millimeter wave base station in the cellular frequency band according to the measurement indication information, so that the cellular base station acquires the measurement result, and determines, according to the measurement result, whether the millimeter wave base station is the to-be-accessed millimeter wave base station of the user equipment may be: sending, by the user equipment, a first measurement signal to the millimeter wave base station in the cellular frequency band according to the second measurement indication information, so that the millimeter wave base station acquires a first measurement result by means of calculation according to the first measurement signal.

The technical solutions in the foregoing method embodiments are described in the following in detail by using two specific embodiments.

Figure 10:
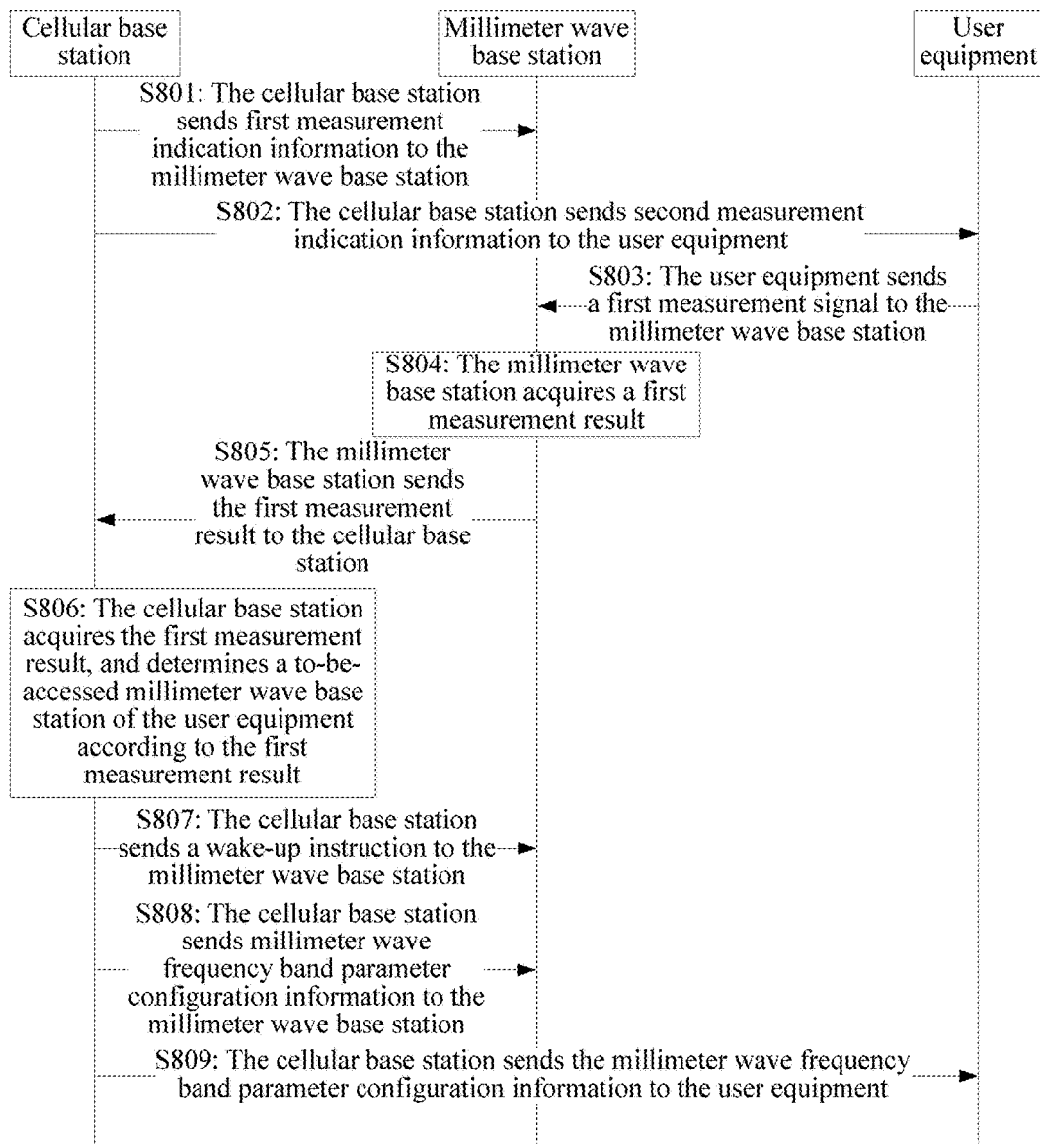
FIG. 10 is a flowchart of Embodiment 8 of a communication method according to an embodiment.

FIG. 10 is a flowchart of Embodiment 8 of a communication method according to an embodiment. As shown in FIG. 10, the method in this embodiment may include:

S801: A cellular base station sends first measurement indication information to a millimeter wave base station.

In this embodiment, the cellular base station sends the first measurement indication information to all or some millimeter wave base stations within coverage of the cellular base station, where the first measurement indication information is used for instructing the millimeter wave base stations to receive a measurement signal on a specified uplink resource.

S802: The cellular base station sends second measurement indication information to a user equipment.

In this embodiment, the cellular base station sends the second measurement indication information to the user equipment in a cellular frequency band, where the second measurement indication information is used for instructing the user equipment to send the measurement signal on the specified uplink resource.

S803: The user equipment sends a first measurement signal to the millimeter wave base station.

In this embodiment, the user equipment sends the first measurement signal on a specified cellular frequency band uplink resource according to the second measurement indication information, where the first measurement signal may include a transmit power of the user equipment, an absolute sending time at which the user equipment sends the measurement signal, or positioning information of the user equipment. The millimeter wave base station has a cellular frequency band receiver, and therefore can receive, in the cellular frequency band, the first measurement signal sent by the user equipment.

S804: The millimeter wave base station acquires a first measurement result.

In this embodiment, a process for acquiring the first measurement result by the millimeter wave base station is similar to that in step 402 in the embodiment shown in FIG. 6, and details are not described herein again.

S805: The millimeter wave base station sends the first measurement result to the cellular base station.

S806: The cellular base station acquires the first measurement result, and determines a to-be-accessed millimeter wave base station of the user equipment according to the first measurement result.

In this embodiment, the cellular base station determines one or more millimeter wave base stations as to-be-accessed millimeter wave base stations of the user equipment according to the first measurement result and a status of a link between the user equipment and the millimeter wave base station and the like, where the first measurement result includes a result of calculation according to the first measurement information, and information such as load or interference of the millimeter wave base station.

S807: The cellular base station sends a wake-up instruction to the millimeter wave base station.

In this embodiment, the cellular base station determines, according to a maintained table of states of millimeter wave base stations within the coverage of the cellular base station, whether the to-be-accessed millimeter wave base station of the user equipment is in a working state, and if not, sends the wake-up instruction to the millimeter wave base station, so that the millimeter wave base station switches from a sleep state to the working state, and starts to transmit a measurement signal and a pilot signal in a millimeter wave frequency band.

S808: The cellular base station sends millimeter wave frequency band parameter configuration information to the millimeter wave base station.

S809: The cellular base station sends the millimeter wave frequency band parameter configuration information to the user equipment.

In this embodiment, the cellular base station sends the millimeter wave frequency band parameter configuration information to the user equipment. After successfully receiving the millimeter wave frequency band parameter configuration information sent by the cellular base station, the user equipment turns on or wakes up a millimeter wave frequency band transceiver of the user equipment, and receives or sends a corresponding measurement pilot signal on a configured millimeter wave frequency band resource, so as to perform a millimeter wave frequency band measurement and access process.

According to this embodiment, based on a cellular frequency band transceiver of a millimeter wave base station, a cellular base station controls the millimeter wave base station and a user equipment to perform measurement signal exchange in a cellular frequency band, and determines a to-be-accessed millimeter wave base station of the user equipment according to a measurement result, and further triggers turn-on or wake-up of the millimeter wave base station that is in a sleep state and a millimeter wave frequency band transceiver of the user equipment, so that the user equipment accesses the to-be-accessed millimeter wave base station, which reduces unnecessary inter-frequency cell search and measurement of the user equipment, decreases consumption of battery power of the user equipment, reduces unnecessary measurement signal and pilot signal transmission of the millimeter wave base station, and avoids power consumption, pilot pollution, and a throughput decrease of the millimeter wave base station.

Figure 11:
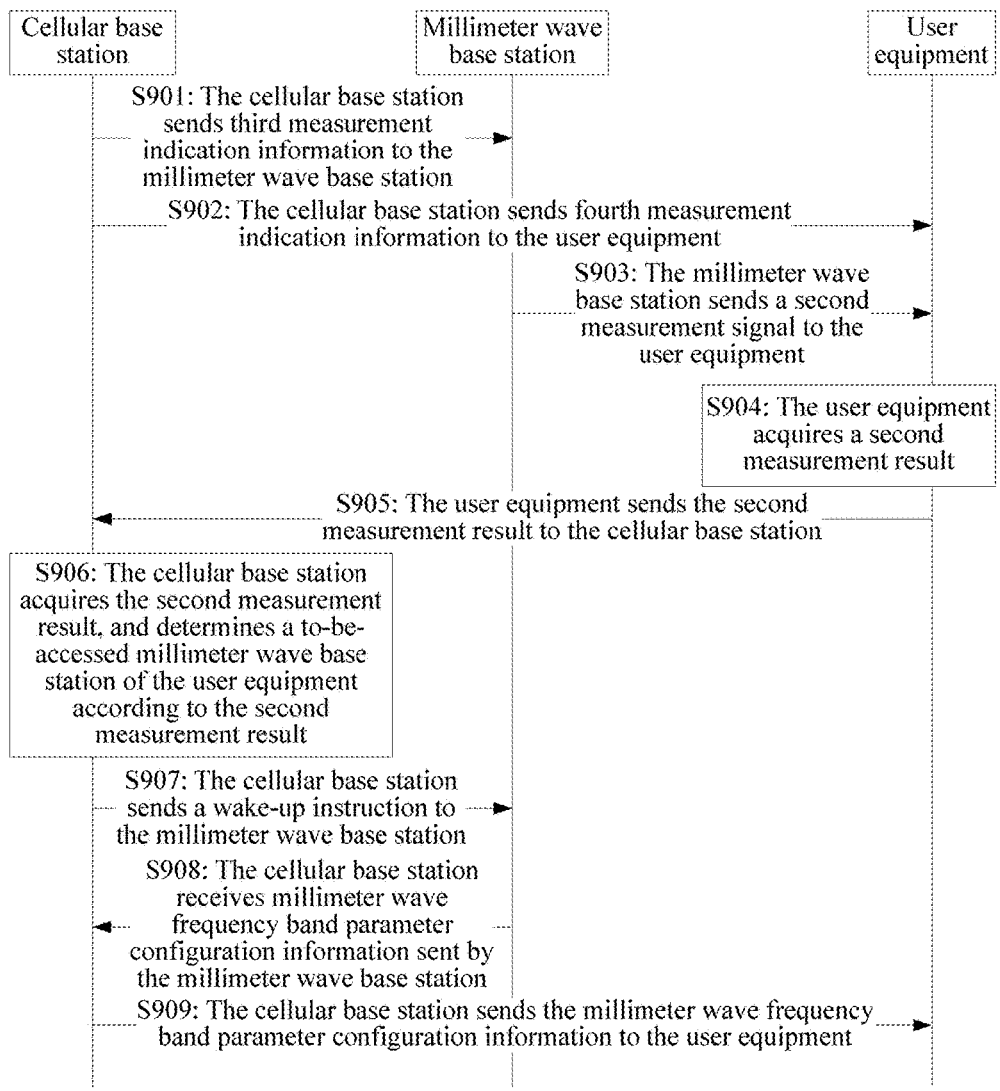
FIG. 11 is a flowchart of Embodiment 9 of a communication method according to an embodiment.

FIG. 11 is a flowchart of Embodiment 9 of a communication method according to an embodiment. As shown in FIG. 11, the method in this embodiment may include:

S901: A cellular base station sends third measurement indication information to a millimeter wave base station.

In this embodiment, the cellular base station sends the third measurement indication information to all or some millimeter wave base stations within coverage of the cellular base station, where the third measurement indication information is used for instructing the millimeter wave base stations to send a measurement signal on a specified downlink resource.

S902: The cellular base station sends fourth measurement indication information to a user equipment.

In this embodiment, the cellular base station sends the fourth measurement indication information to the user equipment in a cellular frequency band, where the fourth measurement indication information is used for instructing the user equipment to receive the measurement signal on the specified downlink resource.

S903: The millimeter wave base station sends a second measurement signal to the user equipment.

In this embodiment, the millimeter wave base station sends the second measurement signal on a specified cellular frequency band downlink resource according to the second measurement indication information, where the second measurement signal may include a transmit power of the millimeter wave base station, an absolute sending time at which the millimeter wave base station sends the measurement signal, or positioning indication information of the millimeter wave base station. The millimeter wave base station has a cellular frequency band transmitter, and therefore can send the second measurement signal to the user equipment in the cellular frequency band.

S904: The user equipment acquires a second measurement result.

In this embodiment, a process for acquiring the second measurement result by the millimeter wave base station is similar to that in step 702 in the embodiment shown in FIG. 9, and details are not described herein again.

S905: The user equipment sends the second measurement result to the cellular base station.

S906: The cellular base station acquires the second measurement result, and determines a to-be-accessed millimeter wave base station of the user equipment according to the second measurement result.

In this embodiment, the cellular base station determines one or more millimeter wave base stations as to-be-accessed millimeter wave base stations of the user equipment according to the second measurement result in combination with information such as load or interference of the millimeter wave base station and a status of a link between the user equipment and the millimeter wave base station and the like.

S907: The cellular base station sends a wake-up instruction to the millimeter wave base station.

In this embodiment, the cellular base station determines, according to a maintained table of states of millimeter wave base stations within the coverage of the cellular base station, whether the to-be-accessed millimeter wave base station of the user equipment is in a working state, and if not, sends the wake-up instruction to the millimeter wave base station, so that the millimeter wave base station switches from a sleep state to the working state, and starts to transmit a measurement signal and a pilot signal in a millimeter wave frequency band.

S908: The cellular base station receives millimeter wave frequency band parameter configuration information sent by the millimeter wave base station.

In this embodiment, if the millimeter wave base station has pre-stored parameter configuration information in the millimeter wave frequency band, the millimeter wave base station may send the information to the cellular base station.

S909: The cellular base station sends the millimeter wave frequency band parameter configuration information to the user equipment.

In this embodiment, the cellular base station sends the millimeter wave frequency band parameter configuration information to the user equipment. After successfully receiving the millimeter wave frequency band parameter configuration information sent by the cellular base station, the user equipment turns on or wakes up a millimeter wave frequency band transceiver of the user equipment, and receives or sends a corresponding measurement pilot signal on a configured millimeter wave frequency band resource, so as to perform a millimeter wave frequency band measurement and access process.

According to this embodiment, based on a cellular frequency band transceiver of a millimeter wave base station, a cellular base station controls the millimeter wave base station and a user equipment to perform measurement signal exchange in a cellular frequency band, and determines a to-be-accessed millimeter wave base station of the user equipment according to a measurement result, and further triggers turn-on or wake-up of the millimeter wave base station that is in a sleep state and a millimeter wave frequency band transceiver of the user equipment, so that the user equipment accesses the to-be-accessed millimeter wave base station, which reduces unnecessary inter-frequency cell search and measurement of the user equipment, decreases consumption of battery power of the user equipment, reduces unnecessary measurement signal and pilot signal transmission of the millimeter wave base station, and avoids power consumption, pilot pollution, and a throughput decrease of the millimeter wave base station.

Figure 12:
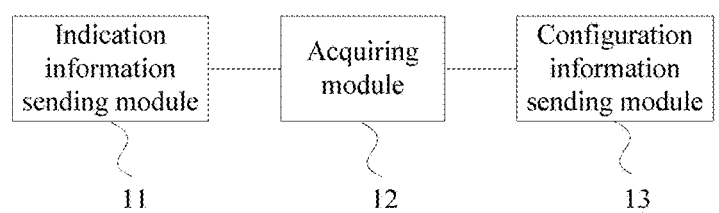
FIG. 12 is a schematic structural diagram of Embodiment 1 of a cellular base station according to an embodiment.

FIG. 12 is a schematic structural diagram of Embodiment 1 of a cellular base station according to an embodiment. As shown in FIG. 12, the apparatus in this embodiment may include: an indication information sending module 11, an acquiring module 12, and a configuration information sending module 13, where the indication information sending module 11 is configured to send measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station; the acquiring module 12 is configure to acquire the measurement result, and determine a to-be-accessed millimeter wave base station of the user equipment according to the measurement result; and the configuration information sending module 13 is configured to send millimeter wave frequency band parameter configuration information of the to-be-accessed millimeter wave base station to the user equipment, so that the user equipment accesses the to-be-accessed millimeter wave base station according to the millimeter wave frequency band parameter configuration information.

The apparatus in this embodiment may be configured to execute the technical solution in the method embodiment shown in FIG. 3, implementation principles and technical effects thereof are similar, and details are not described herein again.

Figure 13:
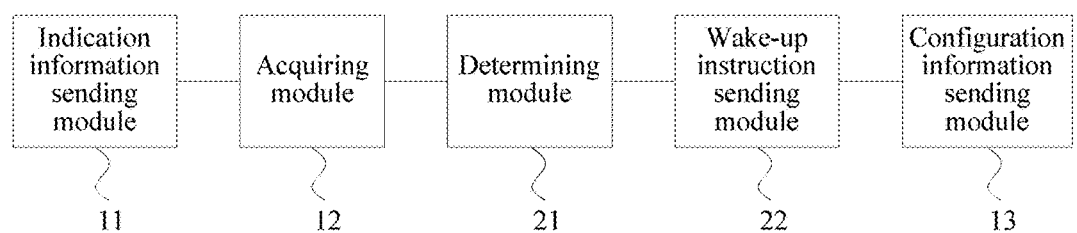
FIG. 13 is a schematic structural diagram of Embodiment 2 of a cellular base station according to an embodiment.

FIG. 13 is a schematic structural diagram of Embodiment 2 of a cellular base station according to an embodiment. As shown in FIG. 13, based on the apparatus structure shown in FIG. 12, further, the apparatus in this embodiment may further include: a determining module 21 and a wake-up instruction sending module 22, where the determining module 21 is configured to determine whether the to-be-accessed millimeter wave base station is in a working state; and the wake-up instruction sending module 22 is configured to: if the determining module determines that the to-be-accessed millimeter wave base station is not in a working state, send a wake-up instruction to the to-be-accessed millimeter wave base station, and after the to-be-accessed millimeter wave base station is waken up, send the millimeter wave frequency band parameter configuration information to the to-be-accessed millimeter wave base station; or send a wake-up instruction to the to-be-accessed millimeter wave base station, and after the to-be-accessed millimeter wave base station is waken up, receive the millimeter wave frequency band parameter configuration information sent by the millimeter wave base station.

The apparatus in this embodiment may be configured to execute the technical solution in the method embodiment shown in FIG. 4, implementation principles and technical effects thereof are similar, and details are not described herein again.

Figure 14:
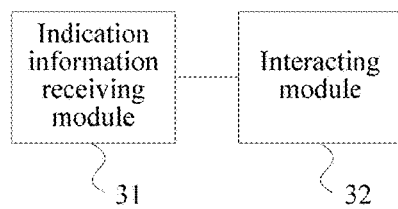
FIG. 14 is a schematic structural diagram of Embodiment 1 of a millimeter wave base station according to an embodiment.

FIG. 14 is a schematic structural diagram of Embodiment 1 of a millimeter wave base station according to an embodiment. As shown in FIG. 14, the apparatus in this embodiment may include: an indication information receiving module 31 and an interacting module 32, where the indication information receiving module 31 is configured to receive measurement indication information sent by a cellular base station; and the interacting module 32 is configured to perform signal measurement interaction with a user equipment in a cellular frequency band according to the measurement indication information, so that the cellular base station acquires a measurement result, and determines, according to the measurement result, whether the millimeter wave base station is a to-be-accessed millimeter wave base station of the user equipment.

The apparatus in this embodiment may be configured to execute the technical solution in the method embodiment shown in FIG. 5, implementation principles and technical effects thereof are similar, and details are not described herein again.

Figure 15:
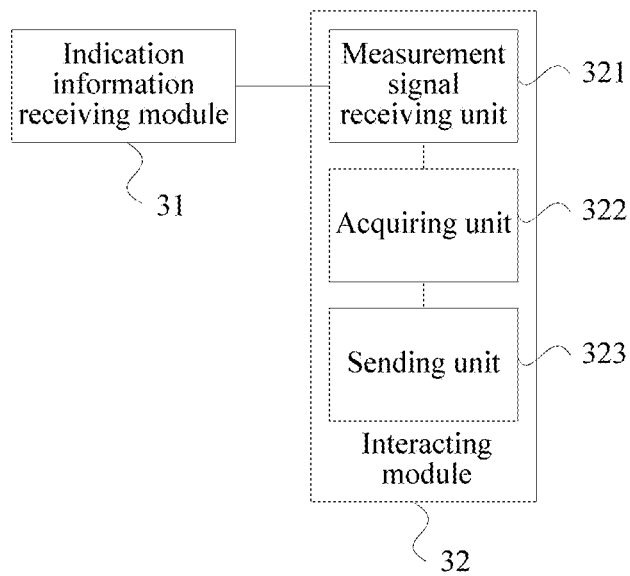
FIG. 15 is a schematic structural diagram of Embodiment 2 of a millimeter wave base station according to an embodiment.

FIG. 15 is a schematic structural diagram of Embodiment 2 of a millimeter wave base station according to an embodiment. As shown in FIG. 15, according to the apparatus in this embodiment, based on the apparatus structure shown in FIG. 14, further, the indication information receiving module 31 is specifically configured to receive first measurement indication information sent by the cellular base station, where the first measurement indication information is used for instructing the millimeter wave base station to receive, in the cellular frequency band according to the first measurement indication information, a measurement signal that is sent by the user equipment in the cellular frequency band; and the interacting module 32 may include: a measurement signal receiving unit 321, an acquiring unit 322, and a sending unit 323, where the measurement signal receiving unit 321 is configured to receive, in the cellular frequency band according to the first measurement indication information, a first measurement signal that is sent by the user equipment in the cellular frequency band; the acquiring unit 322 is configured to acquire a first measurement result according to the first measurement signal; and the sending unit 323 is configured to send the first measurement result to the cellular base station, so that the cellular base station determines, according to the first measurement result, whether the millimeter wave base station is the to-be-accessed millimeter wave base station of the user equipment.

The apparatus in this embodiment may be configured to execute the technical solution in the method embodiment shown in FIG. 6, implementation principles and technical effects thereof are similar, and details are not described herein again.

Figure 16:
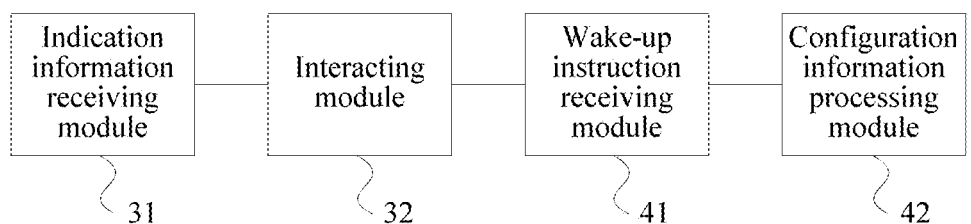
FIG. 16 is a schematic structural diagram of Embodiment 3 of a millimeter wave base station according to an embodiment.

FIG. 16 is a schematic structural diagram of Embodiment 3 of a millimeter wave base station according to an embodiment. As shown in FIG. 16, based on the apparatus structure shown in FIG. 14, further, the apparatus in this embodiment may further include: a wake-up instruction receiving module 41 and a configuration information processing module 42, where the wake-up instruction receiving module 41 is configured to receive a wake-up instruction sent by the cellular base station, and switch the millimeter wave base station from a sleep state to a working state according to the wake-up instruction; and the configuration information processing module 42 is configured to receive, in the working state, millimeter wave frequency band parameter configuration information sent by the cellular base station; or send, in the working state, millimeter wave frequency band parameter configuration information to the cellular base station.

The apparatus in this embodiment may be configured to execute the technical solution in the method embodiment shown in FIG. 7, implementation principles and technical effects thereof are similar, and details are not described herein again.

Figure 17:
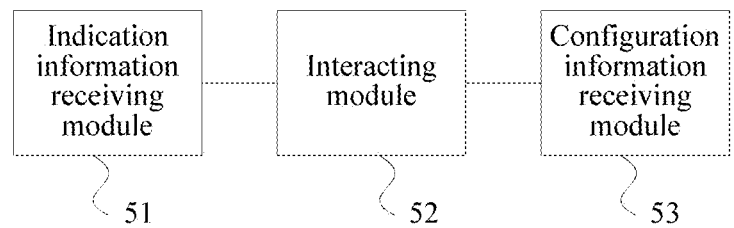
FIG. 17 is a schematic structural diagram of Embodiment 1 of a user equipment according to an embodiment.

FIG. 17 is a schematic structural diagram of Embodiment 1 of a user equipment according to an embodiment. As shown in FIG. 17, the apparatus in this embodiment may include: an indication information receiving module 51, an interacting module 52, and a configuration information receiving module 53, where the indication information receiving module 51 is configured to receive, in a cellular frequency band, measurement indication information sent by a cellular base station; the interacting module 52 is configured to perform signal measurement interaction with a millimeter wave base station in the cellular frequency band according to the measurement indication information, so that the cellular base station acquires a measurement result, and determines, according to the measurement result, whether the millimeter wave base station is a to-be-accessed millimeter wave base station of the user equipment; and the configuration information receiving module 53 is configured to receive, in the cellular frequency band, millimeter wave frequency band parameter configuration information of the to-be-accessed millimeter wave base station that is sent by the cellular base station, and according to the millimeter wave frequency band parameter configuration information, wake up a millimeter wave frequency band function and access the to-be-accessed millimeter wave base station.

The apparatus in this embodiment may be configured to execute the technical solution in the method embodiment shown in FIG. 8, implementation principles and technical effects thereof are similar, and details are not described herein again.

Figure 18:
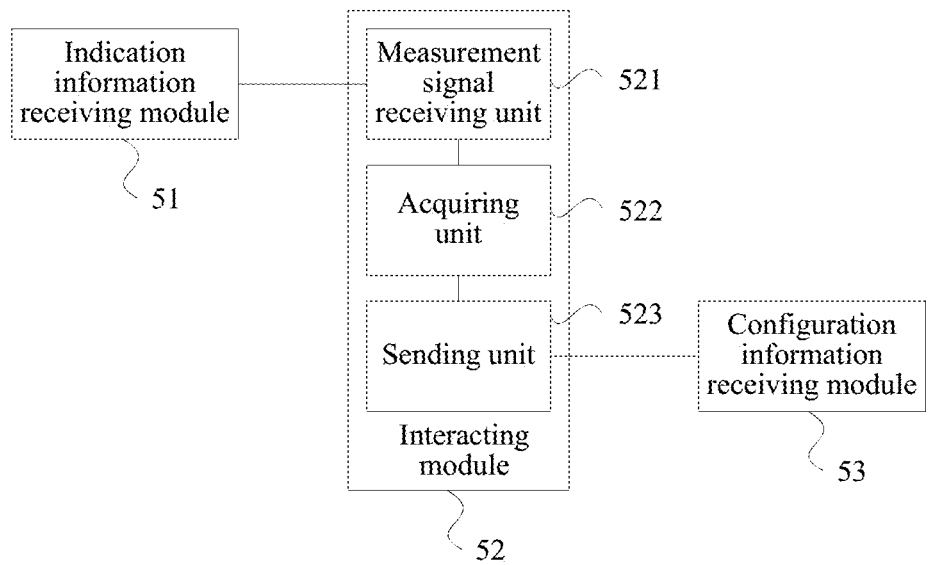
FIG. 18 is a schematic structural diagram of Embodiment 2 of a user equipment according to an embodiment.

FIG. 18 is a schematic structural diagram of Embodiment 2 of a user equipment according to an embodiment. As shown in FIG. 18, according to the apparatus in this embodiment, based on the apparatus structure shown in FIG. 17, further, the indication information receiving module 51 is specifically configured to receive, in the cellular frequency band, fourth measurement indication information that is sent by the cellular base station in the cellular frequency band, where the fourth measurement indication information is used for instructing the user equipment to receive, in the cellular frequency band according to the fourth measurement indication information, the measurement signal that is sent by the millimeter wave base station in the cellular frequency band; and the interacting module 52 may include: a measurement signal receiving unit 521, an acquiring unit 522, and a sending unit 523, where the measurement signal receiving unit 521 is configured to receive, in the cellular frequency band according to the fourth measurement indication information, a second measurement signal that is sent by the millimeter wave base station in the cellular frequency band; the acquiring unit 522 is configured to acquire a second measurement result according to the second measurement signal; and the sending unit 523 is configured to send the second measurement result to the cellular base station in the cellular frequency band, so that the cellular base station determines, according to the second measurement result, whether the millimeter wave base station is the to-be-accessed millimeter wave base station of the user equipment.

The apparatus in this embodiment may be configured to execute the technical solution in the method embodiment shown in FIG. 9, implementation principles and technical effects thereof are similar, and details are not described herein again.

Figure 19:
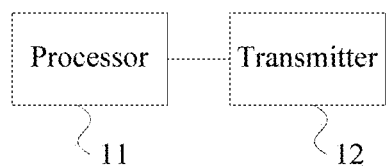
FIG. 19 is a schematic structural diagram of Embodiment 3 of a cellular base station according to an embodiment.

FIG. 19 is a schematic structural diagram of Embodiment 3 of a cellular base station according to an embodiment. As shown in FIG. 19, the device in this embodiment may include: a processor 11 and a transmitter 12, where the transmitter 12 is configured to send measurement indication information to a millimeter wave base station and a user equipment, so that the millimeter wave base station and the user equipment perform signal measurement interaction in a cellular frequency band according to the measurement indication information to acquire a measurement result, where the millimeter wave base station is deployed within coverage of the cellular base station; and the processor 11 is configure to acquire the measurement result, and determine a to-be-accessed millimeter wave base station of the user equipment according to the measurement result; where the transmitter 12 is further configured to send millimeter wave frequency band parameter configuration information of the to-be-accessed millimeter wave base station to the user equipment, so that the user equipment accesses the to-be-accessed millimeter wave base station according to the millimeter wave frequency band parameter configuration information.

The device in this embodiment may be configured to execute the technical solution in the method embodiment shown in FIG. 3, implementation principles and technical effects thereof are similar, and details are not described herein again.

Figure 20:
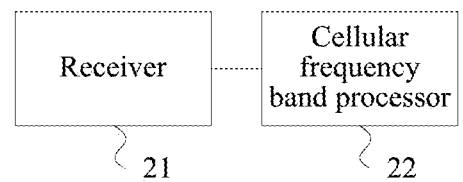
FIG. 20 is a schematic structural diagram of Embodiment 4 of a millimeter wave base station according to an embodiment.

FIG. 20 is a schematic structural diagram of Embodiment 4 of a millimeter wave base station according to an embodiment. As shown in FIG. 20, the device in this embodiment may include: a receiver 21 and a cellular frequency band processor 22, where the receiver 21 is configured to receive measurement indication information sent by a cellular base station; and the cellular frequency band processor 22 is configured to perform signal measurement interaction with a user equipment in a cellular frequency band according to the measurement indication information, so that the cellular base station acquires a measurement result, and determines, according to the measurement result, whether the millimeter wave base station is a to-be-accessed millimeter wave base station of the user equipment.

The device in this embodiment may be configured to execute the technical solution in the method embodiment shown in FIG. 5, implementation principles and technical effects thereof are similar, and details are not described herein again.

Figure 21:
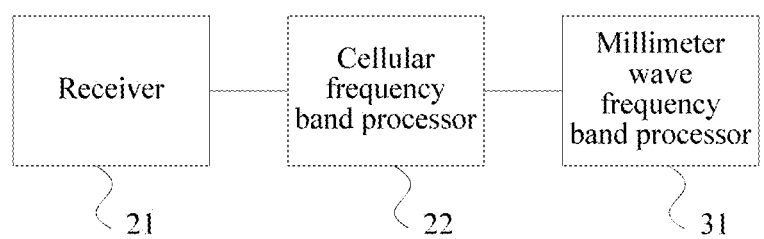
FIG. 21 is a schematic structural diagram of Embodiment 5 of a millimeter wave base station according to an embodiment.

FIG. 21 is a schematic structural diagram of Embodiment 5 of a millimeter wave base station according to an embodiment. As shown in FIG. 21, based on the device structure shown in FIG. 20, further, the device in this embodiment may further include: a millimeter wave frequency band processor 31, where the millimeter wave frequency band processor 31 is configured to receive, in a working state, millimeter wave frequency band parameter configuration information sent by the cellular base station; or send, in a working state, millimeter wave frequency band parameter configuration information to the cellular base station.

The device in this embodiment may be configured to execute the technical solution in the method embodiment shown in FIG. 7, implementation principles and technical effects thereof are similar, and details are not described herein again.

Figure 22:
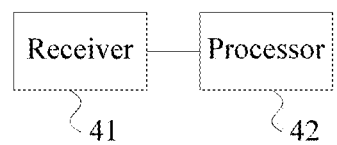
FIG. 22 is a schematic structural diagram of Embodiment 3 of a user equipment according to an embodiment.

FIG. 22 is a schematic structural diagram of Embodiment 3 of a user equipment according to an embodiment. As shown in FIG. 22, the device in this embodiment may include: a receiver 41 and a processor 42, where the receiver 41 is configured to receive, in a cellular frequency band, measurement indication information sent by a cellular base station; and the processor 42 is configured to perform signal measurement interaction with a millimeter wave base station in the cellular frequency band according to the measurement indication information, so that the cellular base station acquires a measurement result, and determines, according to the measurement result, whether the millimeter wave base station is a to-be-accessed millimeter wave base station of the user equipment; where the receiver 41 is further configured to receive, in the cellular frequency band, millimeter wave frequency band parameter configuration information of the to-be-accessed millimeter wave base station that is sent by the cellular base station, and according to the millimeter wave frequency band parameter configuration information, wake up a millimeter wave frequency band function and access the to-be-accessed millimeter wave base station.

The equipment in this embodiment may be configured to execute the technical solution in the method embodiment shown in FIG. 8, implementation principles and technical effects thereof are similar, and details are not described herein again.

Figure 23:
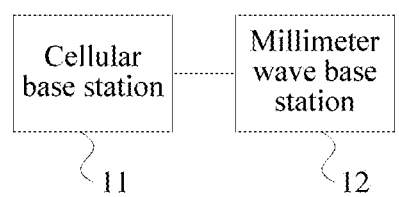
FIG. 23 is a schematic structural diagram of an embodiment of a millimeter wave communication system according to an embodiment.

FIG. 23 is a schematic structural diagram of an embodiment of a millimeter wave communication system according to an embodiment. As shown in FIG. 23, the system in this embodiment includes: a cellular base station 11 and a millimeter wave base station 12, where the cellular base station 11 may be of the structure in the apparatus embodiment shown in FIG. 12 or FIG. 13, and correspondingly may execute the technical solution in the method embodiment shown in FIG. 3 or FIG. 4, implementation principles and technical effects are similar, and details are not described herein again; and the millimeter wave base station 12 may be of the structure in any one of the apparatus embodiments shown in FIG. 14 to FIG. 16, and correspondingly may execute the technical solution in any one of the method embodiments shown in FIG. 5 to FIG. 7, implementation principles and technical effects are similar, and details are not described herein again.

Further, a physical device of the millimeter wave communication system according to an embodiment may include: a cellular base station and a millimeter wave base station, where the cellular base station may be of the structure in the device embodiment shown in FIG. 19, and correspondingly may execute the technical solution in the method embodiment shown in FIG. 3 or FIG. 4, implementation principles and technical effects are similar, and details are not described herein again; and the millimeter wave base station may be of the structure in the device embodiment shown in FIG. 20 or FIG. 21, and correspondingly may execute the technical solution in any one of the method embodiments shown in FIG. 5 to FIG. 7, implementation principles and technical effects are similar, and details are not described herein again.

In the several disclosed embodiments, it should be understood that the disclosed apparatus and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) or a processor to perform some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is merely used as an example for illustration. In an actual application, the foregoing functions may be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions, but not for limiting the present invention. Although the embodiments are described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A communication method, comprising:
sending, by a cellular base station, first measurement indication information to a plurality of millimeter wave base stations and sending second measurement indication information to a user equipment, wherein the first measurement indication information instructs the plurality of millimeter wave base stations to receive, in a cellular frequency band according to the first measurement indication information, a measurement signal that is sent by the user equipment in the cellular frequency band, and wherein the second measurement indication information instructs the user equipment to send the measurement signal to the plurality of millimeter wave base stations in the cellular frequency band according to the second measurement indication information, so that the plurality of millimeter wave base stations and the user equipment perform measurement signal interaction in the cellular frequency band to acquire measurement results, wherein each millimeter wave base station of the plurality of millimeter wave base stations is deployed within coverage of the cellular base station;
acquiring, by the cellular base station, the measurement results, and determining a to-be-accessed millimeter wave base station from the plurality of millimeter wave base stations according to the measurement result; and
sending, by the cellular base station, millimeter wave frequency band parameter configuration information of the to-be-accessed millimeter wave base station to the user equipment, so that the user equipment accesses the to-be-accessed millimeter wave base station according to the millimeter wave frequency band parameter configuration information.

2. The method according to claim 1, wherein the acquiring, by the cellular base station, the measurement results comprises: receiving, by the cellular base station, a first measurement result sent by the plurality of millimeter wave base station, wherein the first measurement result is obtained by the millimeter wave base stations according to the measurement signal sent by the user equipment.

3. The method according to claim 1, wherein the determining the to-be-accessed millimeter wave base station according to the measurement result comprises:
determining, by the cellular base station, the to-be-accessed millimeter wave base station according to the measurement results and load information of the plurality of millimeter wave base stations.

4. The method according to claim 1, wherein the method further comprises, before the sending the millimeter wave frequency band parameter configuration information of the to-be-accessed millimeter wave base station to the user equipment: determining, by the cellular base station, whether the to-be-accessed millimeter wave base station is in a working state; sending, by the cellular base station and in response to determining that the to-be-accessed millimeter wave base station is not in the working state, a wake-up instruction to the to-be-accessed millimeter wave base station; and sending, after the to-be-accessed millimeter wave base station is awakened, the millimeter wave frequency band parameter configuration information to the to-be-accessed millimeter wave base station.

5. The method according to claim 1, wherein the method further comprises, before the sending the millimeter wave frequency band parameter configuration information of the to-be-accessed millimeter wave base station to the user equipment: determining, by the cellular base station, whether the to-be-accessed millimeter wave base station is in a working state; sending, by the cellular base station and in response to determining that the to-be-accessed millimeter wave base station is not in the working state, a wake-up instruction to the to-be-accessed millimeter wave base station; and receiving, after the to-be-accessed millimeter wave base station is awakened, the millimeter wave frequency band parameter configuration information sent by the to-be-accessed millimeter wave base station.

6. A cellular base station, comprising:
a transmitter, configured to send first measurement indication information to a plurality of millimeter wave base stations and send second measurement indication information to a user equipment, wherein the first measurement indication information is used for instructing the plurality of millimeter wave base stations to receive, in a cellular frequency band according to the first measurement indication information, a measurement signal that is sent by the user equipment in the cellular frequency band, and the second measurement indication information is used for instructing the user equipment to send the measurement signal to the plurality of millimeter wave base stations in the cellular frequency band according to the second measurement indication information, so that the plurality of millimeter wave base stations and the user equipment perform measurement signal interaction in the cellular frequency band to acquire measurement results, wherein each millimeter wave base station of the plurality of millimeter wave base stations is deployed within coverage of the cellular base station;
a processor; and
a non-transitory computer-readable storage medium storing a program to be executed by the processor, the program including instructions to:
acquire the measurement results, and determine a to-be-accessed millimeter wave base station from the plurality of millimeter wave base stations according to the measurement results;
wherein the transmitter is further configured to send millimeter wave frequency band parameter configuration information of the to-be-accessed millimeter wave base station to the user equipment, so that the user equipment accesses the to-be-accessed millimeter wave base station according to the millimeter wave frequency band parameter configuration information.

7. The cellular base station according to claim 6,
wherein the instructions to acquire the measurement results include instructions to to receive the measurement results sent by the plurality of millimeter wave base stations, wherein the measurement results are respectively obtained by the plurality of millimeter wave base stations according to the measurement signal sent by the user equipment; and
determine the to-be-accessed millimeter wave base stations according to the measurement results.

8. The cellular base station according to claim 6, wherein the program further includes instructions to:
receive the measurement results, and determine the to-be-accessed millimeter wave base station according to the measurement results and load information of the plurality of millimeter wave base stations.

9. The cellular base station according to claim 6, wherein the program further includes instructions to determine whether the to-be-accessed millimeter wave base station is in a working state; and
wherein the transmitter is further configured to send a wake-up instruction to the to-be-accessed millimeter wave base station in response to determining that the to-be-accessed millimeter wave base station is not in the working state, and, after the to-be-accessed millimeter wave base station is awakened, send the millimeter wave frequency band parameter configuration information to the to-be-accessed millimeter wave base station.

10. The cellular base station according to claim 6, wherein the program further includes instructions to determine whether the to-be-accessed millimeter wave base station is in a working state; and
wherein the transmitter is further configured to send a wake-up instruction to the to-be-accessed millimeter wave base station in response to determining that the to-be-accessed millimeter wave base station is not in the working state, and, after the to-be-accessed millimeter wave base station is waken up, receive the millimeter wave frequency band parameter configuration information sent by the to-be-accessed millimeter wave base station.

11. A millimeter wave base station, comprising:
a receiver, configured to receive first measurement indication information sent by a cellular base station, wherein the first measurement indication information is used for instructing the millimeter wave base station to receive, in a cellular frequency band according to the first measurement indication information, a measurement signal that is sent by a user equipment in the cellular frequency band; and
a cellular frequency band processor, configured to perform measurement signal interaction with the user equipment in the cellular frequency band according to the first measurement indication information, so that the cellular base station acquires a measurement result, and determines, according to the measurement result, whether the millimeter wave base station is a to-be-accessed millimeter wave base station.

12. The millimeter wave base station according to claim 11,
wherein the cellular frequency band processor is further configured to:
receive, in the cellular frequency band according to the first measurement indication information, the measurement signal that is sent by the user equipment in the cellular frequency band;
acquire a first measurement result according to the measurement signal; and
send the first measurement result to the cellular base station, so that the cellular base station determines, according to the first measurement result, whether the millimeter wave base station is the to-be-accessed millimeter wave base station.

13. The millimeter wave base station according to claim 11, wherein the receiver is configured to receive a wake-up instruction sent by the cellular base station, and to switch the millimeter wave base station from a sleep state to a working state according to the wake-up instruction; and
wherein the millimeter wave base station further comprises a millimeter wave frequency band processor, configured to receive, in the working state, millimeter wave frequency band parameter configuration information sent by the cellular base station.

14. The millimeter wave base station according to claim 11, wherein the receiver is configured to receive a wake-up instruction sent by the cellular base station, and to switch the millimeter wave base station from a sleep state to a working state according to the wake-up instruction; and
wherein the millimeter wave base station further comprises a millimeter wave frequency band processor, configured to send, in the working state, millimeter wave frequency band parameter configuration information to the cellular base station.

15. A user equipment, comprising:
a receiver, configured to receive, in a cellular frequency band, second measurement indication information that is sent by a cellular base station in the cellular frequency band, wherein the second measurement indication information is instructs the user equipment to send a measurement signal to a millimeter wave base station in the cellular frequency band according to the second measurement indication information;
a processor; and
a non-transitory computer-readable storage medium storing a program to be executed by the processor, the program including instructions to:
perform measurement signal interaction with the millimeter wave base station in the cellular frequency band according to the second measurement indication information, so that the cellular base station acquires a measurement result, and determines, according to the measurement result, whether the millimeter wave base station is a to-be-accessed millimeter wave base station;
wherein the receiver is further configured to receive, in the cellular frequency band, millimeter wave frequency band parameter configuration information of the to-be-accessed millimeter wave base station that is sent by the cellular base station, and according to the millimeter wave frequency band parameter configuration information, wake up a millimeter wave frequency band function and access the to-be-accessed millimeter wave base station.

16. The user equipment according to claim 15,
wherein the program further includes instructions to send the measurement signal to the millimeter wave base station in the cellular frequency band according to the second measurement indication information, so that the millimeter wave base station acquires a first measurement result by means of calculation according to the measurement signal.

* * * * *